United States Patent
Tamori et al.

(10) Patent No.: US 6,953,821 B2
(45) Date of Patent: Oct. 11, 2005

(54) AQUEOUS DISPERSION, PROCESS FOR PRODUCTION THEREOF AND COATED SUBSTANCES

(75) Inventors: Kouji Tamori, Tokyo (JP); Kenji Ishizuki, Tokyo (JP); Hiroshi Shiho, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/958,984

(22) PCT Filed: Feb. 16, 2001

(86) PCT No.: PCT/JP01/01109

§ 371 (c)(1),
(2), (4) Date: Oct. 16, 2001

(87) PCT Pub. No.: WO01/60920

PCT Pub. Date: Aug. 23, 2001

(65) Prior Publication Data

US 2003/0045626 A1 Mar. 6, 2003

(30) Foreign Application Priority Data

Feb. 16, 2000 (JP) ........................................ 2000-037733

(51) Int. Cl.⁷ ................................................ C08K 3/20
(52) U.S. Cl. ...................... 524/457; 428/429; 428/446; 428/447; 428/451; 524/501; 524/506; 524/547; 524/588; 524/730; 524/731
(58) Field of Search ................................ 524/547, 731, 524/457, 506, 730, 588, 501; 428/429, 446, 447, 451

(56) References Cited

U.S. PATENT DOCUMENTS

| | | | | |
|---|---|---|---|---|
| 3,449,293 A | | 6/1969 | Burzynski et al. | |
| 4,138,387 A | * | 2/1979 | Bluestein | 524/425 |
| 4,267,091 A | * | 5/1981 | Geelhaar et al. | 524/189 |
| 5,250,609 A | * | 10/1993 | Kato et al. | 524/560 |
| 5,472,996 A | * | 12/1995 | Hayashi et al. | 523/201 |
| 5,516,868 A | * | 5/1996 | Yamazaki et al. | 528/12 |
| 5,594,067 A | * | 1/1997 | Doi et al. | 524/806 |
| 5,852,095 A | * | 12/1998 | Yamauchi et al. | 524/262 |
| 5,973,068 A | * | 10/1999 | Yamaya et al. | 524/506 |
| 6,071,987 A | * | 6/2000 | Matsumoto et al. | 523/209 |
| 6,114,440 A | * | 9/2000 | Yamaya et al. | 524/865 |
| 6,147,156 A | * | 11/2000 | Yamaya et al. | 524/806 |

FOREIGN PATENT DOCUMENTS

| | | | |
|---|---|---|---|
| EP | 0153600 A1 | * | 4/1985 |
| JP | 50-151958 | | 12/1975 |
| JP | 60-135465 | | 7/1985 |
| JP | 60-181173 | | 9/1985 |
| JP | 62-267374 | | 11/1987 |
| JP | 64-001769 | | 1/1989 |
| JP | 2-67324 | | 3/1990 |
| JP | 3-45628 | | 2/1991 |
| JP | 4-175343 | | 6/1992 |
| JP | 4-214747 | | 8/1992 |
| JP | 5-93071 | | 4/1993 |
| JP | 6-256522 | | 9/1994 |
| JP | 7-10908 | | 1/1995 |
| JP | 8-3409 | | 1/1996 |
| JP | 9-137123 | | 5/1997 |
| JP | 9-137124 | | 5/1997 |
| JP | 9-137125 | | 5/1997 |
| JP | 9-137126 | | 5/1997 |
| JP | 9-137127 | | 5/1997 |
| JP | 9-169818 | | 6/1997 |
| JP | 9-176437 | | 7/1997 |
| JP | 9-176488 | | 7/1997 |
| JP | 10-183064 | | 7/1998 |
| JP | 11-12505 | | 1/1999 |
| JP | 11-255846 | | 9/1999 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

An aqueous dispersion obtained by hydrolysis/condensation and radical polymerization of a mixture containing (A) at least one selected from an organosilane, a hydrolyzate of the organosilane and a condensate of the organosilane, and (B) a radical polymerizable vinyl monomer, in an emulsified state.

19 Claims, No Drawings

AQUEOUS DISPERSION, PROCESS FOR PRODUCTION THEREOF AND COATED SUBSTANCES

TECHNICAL FIELD

The present invention relates to an aqueous dispersion, and more particularly to an aqueous dispersion which is excellent in storage stability, adhesion, resistance to alkalis, resistance to organic chemicals, resistance to weather, resistance to (hot) water, stain recovery and so forth, and which can form a transparent coating film high in hardness.

BACKGROUND ART

Previously, coating materials have been used in various fields, and the scope of application thereof keeps on expanding. Accompanying with above, higher-level performances have increasingly been required for the coating materials. In recent years, coating materials have been desired which are excellent in the balance of performances such as adhesion, resistance to chemicals, resistance to moisture, resistance to weather, resistance to (hot) water, stain recovery and so forth, and can form coating films high in hardness.

As coating materials partly satisfying such requirements, there is proposed a composition comprising a partial condensate of an organosilane, a dispersion of colloidal silica and a silicone-modified acrylic resin (Japanese Patent Laid-open Publication (Sho) 60-135465), or a composition comprising a condensate of an organosilane, a chelate compound of a zirconium alkoxide and a hydrolytic silyl group-containing vinyl resin (Japanese Patent Laid-open Publication (Sho) 64-1769) and so forth.

However, all these coating materials are of the solvent type, and are shifting to aqueous coating materials, because of strong demands for desolvation from the viewpoints of low pollution, resource saving and safety and sanitation in recent years.

In such a situation, as ones that can be expected to improve performances such as resistance to water and resistance to chemicals, the developments of reactive resin emulsions have intensively been studied, and as one of them, hydrolytic silyl group-containing resin emulsions have been proposed. As examples thereof, a reactive resin emulsion comprising a hydrolytic silyl group- and amineimido group-containing vinyl polymer is described in Japanese Patent Laid-open Publication (Hei) 7-26035, and an aqueous coating composition comprising an aqueous dispersion of an alkoxysilyl group-containing vinyl polymer and aqueous dispersion of a tin compound is described in Japanese Patent Laid-open Publication (Hei) 7-91510.

However, these hydrolytic silyl group-containing resin emulsions are poor in storage stability, and have a problem in respect of practicability, because particularly when stored for a long period of time, the emulsions gel, or coating films obtained from the emulsions after long-term storage are different from coating films obtained from the emulsions immediately after production in performances, resulting in failure to ensure stable quality. Even when the emulsions are relatively good in storage stability, the total balance of performances such as adhesion, resistance to chemicals, resistance to moisture, resistance to weather, resistance to (hot) water, stain recovery and so forth can not be satisfied.

Further, a silicone resin-containing emulsion composition obtained by emulsion polymerization of a mixed solution containing a silanol group-containing silicone resin and a radical polymerizable vinyl monomer is proposed in Japanese Patent Laid-open Publication (Hei) 11-255846.

However, using this technique causes precipitation of a large amount of condensate during polymerization, or reduction of polymerization ability, so that it is inapplicable in industry.

The present invention has been made against the background of the above-mentioned prior-art problems, and an object of the present invention is to provide an aqueous dispersion which is extremely excellent in storage stability, excellent in the balance of performances such as adhesion, resistance to alkalis, resistance to organic chemicals, resistance to moisture, resistance to weather, resistance to (hot) water, stain recovery and so forth, can form a coating film which is transparent and high in hardness, and particularly, is useful as a coating material.

DISCLOSURE OF THE INVENTION

The present invention concerns an aqueous dispersion obtained by hydrolysis/condensation and radical polymerization of a mixture containing (A) at least one selected from an organosilane, a hydrolyzate of the organosilane and a condensate of the organosilane, and (B) a radical polymerizable vinyl monomer, in an emulsified state.

Further, the present invention relates to a method for producing the above-mentioned aqueous dispersion comprising emulsifying a mixture containing (A) at least one selected from an organosilane, a hydrolyzate of the organosilane and a condensate of the organosilane, and (B) a radical polymerizable vinyl monomer, in the presence of water and an emulsifier, and then, adding a radical polymerization initiator to conduct hydrolysis/condensation and radical polymerization.

Furthermore, the present invention concerns a coating material (coating) containing the above-mentioned aqueous dispersion, and a coated product comprising a substrate and the coating material painted thereon.

Here, the above-mentioned substrate may be provided with an undercoat layer.

BEST MODE FOR CARRYING OUT THE INVENTION

The aqueous dispersion of the present invention has the following advantages which have never been obtained by conventional known methods:

(1) Vinyl monomer (B) is polymerized in an emulsion particle in the presence of component (A), a siloxane component, so that the siloxane component and the vinyl polymer form an interpenetrating network (IPN) structure. As a result, even when a methyl silicone resin poor in mutual solubility is used as the siloxane component, a coating film excellent in transparency is formed, and deficiencies in characteristics of both resins are also filled up. In particular, a silicone resin rich in hardness, resistance to chemicals and resistance to weather can be contained in large amounts, so that a coating layer formed provides a uniform hardened coating layer excellent in film forming properties, good in characteristics such as resistance to scratches, resistance to weather and resistance to chemicals, and good in flexibility.

(2) Polymer molecules are entangled with one another in a solventless state in an emulsion particle, so that the degree of freedom of a condensation activity-rich silanol group contained in the siloxane component is limited. As a result, the condensation of the silanol group is inhibited to give good storage stability.

(3) When a silanol group having a specific structure is contained in a definite amount or more in the siloxane component (silicone resin), the silanol group is restrained in a good state in an emulsion particle, whereas its high hardening activity is retained to ensure excellent hardenability even at relatively low temperatures. Further, the straight-chain structure is increased by allowing a silanol group having a specific structure such as a dialkoxysilane to be contained in large amounts, as the hydrolytic silane compound, and the conflicting characteristics of flexibility and hardness can be imparted to a coating layer at the same time.

(4) A low boiling organic solvent having a boiling point of lower than 100° C. or an aromatic organic solvent such as toluene is not substantially contained, so that good working environment is ensured.

(5) When a specific hardening catalyst is used together, hardening at room temperature is possible, and quick hardening is also possible even at relatively low temperatures.

The present invention will be described in turn below.

Component (A)

The organosilane in component (A) constituting the aqueous dispersion of the present invention is generally represented by the following general formula (I):

$$(R^1)_n Si(OR^2)_{4-n} \qquad (1)$$

(wherein $R^1$ indicates a monovalent organic group having 1 to 8 carbon atoms, wherein when two $R^1$'s exist, they are the same or different; $R^2$'s, which are the same or different, each indicate alkyl groups having 1 to 5 carbon atoms or acyl groups having 1 to 6 carbon atoms; and n is an integer of from 0 to 2).

In the hydrolyzate of the above-mentioned organosilane, it is unnecessary that all of two to four $OR^2$ groups contained in the organosilane represented by the above-mentioned general formula (1) are hydrolyzed. For example, it may be one in which only one is hydrolyzed, one in which two or more are hydrolyzed, or a mixture thereof.

Further, the condensate of the above-mentioned organosilane is one in which silanol groups of the hydrolyzate of the organosilane are condensed to form a Si—O—Si bond. In the present invention, however, it is unnecessary that all the silanol groups are condensed, and the condensate of the organosilane is a concept including one in which a few part of the silanol groups have been condensed and a mixture of condensates whose levels of condensation are different.

It is preferred in terms of the balance of resistance to weather and adhesion that at least one selected from the group consisting of an organosilane represented by $(R^1)$—(Si)—$(OR^2)_3$ (wherein $R^1$ and $R^2$ are the same as given above), a hydrolyzate of the organosilane and a condensate of the organosilane is used as component (A) in an amount of 50 mol % or more based on the total component (A).

In general formula (1), the monovalent organic group of $R^1$ having 1 to 8 carbon atoms includes, for example, an alkyl group such as methyl, ethyl, n-propyl, i-propyl, n-butyl, i-butyl, sec-butyl, t-butyl, n-hexyl, n-heptyl, n-octyl or 2-ethylhexyl; an acyl group such as acetyl, propionyl, butyryl, valeryl, benzoyl, trioyl or caproyl; a vinyl group; an allyl group; a cyclohexyl group; a phenyl group; an epoxy group; a glycidyl group; a (meth)acryloxy group; a ureido group; an amido group; a fluoroacetoamido group; an isocyanato group and so forth, and substituent derivatives thereof.

The substituent groups in the substituent derivatives of $R^1$ include, for example, a halogen atom, a substituted or unsubstitued amino group, a hydroxyl group, a mercapto group, an isocyanate group, a glycidoxy group, a 3,4-epoxycyclohexyl group, a (meth)acryloxy group, a ureido group, an ammonium salt group and so forth. The number of carbon atoms in each of these substituent derivatives of $R^1$ is 8 or less including the carbon atoms in the substituent group.

When two $R^1$'s exist in general formula (1), they may be either identical with or different from each other.

The alkyl group of $R^2$ having 1 to 5 carbon atoms includes, for example, methyl, ethyl, n-propyl, i-propyl, n-butyl, sec-butyl, t-butyl, n-pentyl and so forth. The acyl group having 1 to 6 carbon atoms includes, for example, acetyl, propionyl, butyryl, valeryl, caproyl and so forth.

A plurality of $R^2$'s existing in general formula (1) may be either identical with or different from each other.

Specific examples of such organosilanes include methyltriacetyloxysilane and dimethyldiacetyloxysilane, as well as tetraalkoxysilanes such as tetramethoxysilane, tetraethoxysilane, tetra-n-propoxysilane, tetra-i-propoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxy-silane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane and 3-ureidopropyltriethoxysilane; and dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane and diphenyldiethoxysilane.

Of these, preferably used are trialkoxysilanes and dialkoxysilanes. As the trialkoxysilanes, preferred are methyltrimethoxysilane and methyltriethoxysilane. Further, as the dialkoxysilane, preferred are dimethyldimethoxysilane and dimethyldiethoxysilane.

Component (A) is at least one selected from the organosilane, the hydrolyzate of the organosilane and the condensate of the organosilane. That is to say, component (A) may be one of these three kinds, a mixture of any two kinds or a mixture containing all the three kinds. In the present invention, it is preferred that the organosilane and the condensate of the organosilane (hereinafter also referred to as "polyorganosiloxane") are used as a mixture. In the aqueous dispersion of the present invention, a coating layer excellent in characteristics such as hardness, resistance to chemicals, resistance to weather, film forming properties, transparency and resistance to cracks is formed by co-condensation of the organosilane and the polyorganosiloxane. Further, polymerization stability in polymerization of the vinyl compound after emulsification is significantly improved, and polymerization can be conducted at high solid content. Accordingly, there is also the advantage of easy industrialization.

When two kinds of the organosilane and the polyorganosiloxane are used, a dialkoxysilane is preferably used as the organosilane. The use of the dialkoxysilane adds a straight-chain component as a molecular chain, which causes an increase in flexibility of particles obtained. Further, when a coating film is formed by use of the resulting aqueous dispersion, the effect of obtaining a coating film excellent in transparency is achieved. As the above-mentioned dialkoxysilanes, dimethyldimethoxysilane, dimethyldiethoxysilane and so forth are particularly preferred.

Further, when two kinds of the organosilane and the polyorganosiloxane are used, it is particularly preferred that the polyorganosiloxane is a condensate of only a trialkoxysilane or a condensate of 40 to 95 mol % of a trialkoxysilane and 60 to 5 mol % of a dialkoxysilane. The use of the dialkoxysilane in combination with the trialkoxysilane can soften the resulting coating film and improve resistance to alkalis.

The polyorganosiloxane is used as the condensate of the organosilane obtained by previously hydrolyzing and condensing the organosilane. In this case, in preparing the polyorganosiloxane, the organosilane is preferably hydrolyzed and condensed by adding a proper amount of water, and optionally an organic solvent, to the organosilane.

The amount of water used herein is usually from about 1.2 to about 3.0 moles, and preferably from about 1.3 to 2.0 moles, per mole of organosilane.

There is no particular limitation on the organic solvent optionally used in this case, as long as it can uniformly mix the polyorganosiloxane and component (B) described later. The organic solvents include, for example, alcohols, aromatic hydrocarbons, ethers, ketones, esters and so forth.

Of these organic solvents, specific examples of the alcohols include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, diacetone alcohol and so forth.

Specific examples of the aromatic hydrocarbons include benzene, toluene, xylene and so forth, specific examples of the ethers include tetrahydrofuran, dioxane and so forth, specific examples of the ketones include acetone, methyl ethyl ketone, methyl isobutyl ketone, diisobutyl ketone and so forth, and specific examples of the esters include ethyl acetate, propyl acetate, butyl acetate, propylene carbonate and so forth.

These organic solvents may be used alone or as a mixture of two or more of them.

When the organic solvent is contained in the polyorganosiloxane, this organic solvent can also be removed from the aqueous dispersion before condensation/polymerization described later.

The polystyrene-converted weight-average molecular weight (hereinafter referred to as "Mw") of the polyorganosiloxane is preferably from 800 to 100,000, and more preferably from 1,000 to 50,000.

The polyorganosiloxane is commercially available as MKC silicate manufactured by Mitsubishi Chemical Corporation, an ethyl silicate manufactured by Colcoat Co., a silicone resin manufactured by Dow Corning Toray Silicone Co., Ltd., a silicon resin manufactured by Toshiba Silicones Co., a silicone resin manufacturedby Shin-Etsu Chemical Co., Ltd., hydroxyl group-containing polydimethylsiloxane manufactured by Dow Corning, Asia, a silicone oligomer manufactured by Nippon Unicar Company Limited and so forth, and these may be used as such, or as their condensates.

When the organosilane and the polyorganosiloxane are used as component (A), for the mixing ratio of both, the amount of the organosilane (converted to a completely hydrolyzed condensate) is from 95% to 5% by weight, and preferably from 90% to 10% by weight, and the amount of the polyorganosiloxane (converted to a completely hydrolyzed condensate) is from 5% to 95% by weight, and preferably from 10% to 90% by weight (with the proviso that the organosilane+the polyorganosiloxane=100% by weight). Less than 5% by weight of the polyorganosiloxane is unfavorable, because tackiness is observed on a surface of a coating film obtained, or the hardenability of the coating film is deteriorated, in some cases. On the other hand, exceeding 95% by weight results in too low a ratio of the organosilane component, which makes it difficult to emulsify a mixture containing component (A), and reduces polymerization stability of radical polymerizable vinyl monomer (B) after emulsification. Further, the stability of an emulsion after emulsification is unfavorably lowered, or the film forming properties of an organic inorganic complex obtained is unfavorably deteriorated.

The above-mentioned completely hydrolyzed condensate as used herein means a condensate in which 100% of $R^2O$-groups of the organosilane are hydrolyzed to SiOH groups, which are further completely condensed to form a siloxane structure.

Radical Polymerizable Vinyl Monomer (B)

There is no particular limitation on component (B), as long as it is a monomer having a radical polymerizable unsaturated double bond.

Components (B) include, for example, (meth)acrylic acid; (meth)acrylates such as methyl (meth)acrylate, ethyl (meth)acrylate, propyl (meth)acrylate, n-butyl (meth)acrylate, i-butyl (meth)acrylate, amyl (meth)acrylate, i-amyl (meth)acrylate, hexyl (meth)acrylate, 2-ethylhexyl (meth)acrylate, n-octyl (meth)acrylate and cyclohexyl (meth)acrylate; hydroxyl group-containing (meth)acrylates such as 2-hydroxyethyl (meth)acrylate, 2-hydroxypropyl (meth)acrylate and 3-hydroxypropyl (meth)acrylate; multifunctional (meth)acrylates such as ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, tetrapropylene glycol di(meth)acrylate, butanediol di(meth)acrylate, hexanediol di(meth)acrylate, trimethylolpropane tri(meth)acrylate and pentaerythritol tetra(meth)acrylate; fluorine atom-containing (meth)acrylates such as trifluoroethyl (meth)acrylate and pentadecafluorooctyl (meth)acrylate; amino group-containing (meth)acrylates such as 2-aminoethyl (meth)acrylate, 2-aminopropyl (meth) acrylate and 3-aminopropyl (meth)acrylate; epoxy group-containing (meth)acrylates such as glycidyl (meth)acrylate and so forth.

In addition, components (B) include aromatic vinyl monomers such as styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 3,4-diethylstyrene, 2-chlorostyrene, 3-chlorostyrene, 4-chloro-3-methylstyrene, 4-t-butylstyrene, 2,4-dichlorostyrene, 2,6-dichlorostyrene and 1-vinylnaphthalene; multifunctional monomers other than the above such as divinylbenzene; acid amide compounds such as (meth)acrylamide, N-methoxymethyl(meth) acrylamide, N-butoxymethyl(meth)acrylamide, N,N'-methylenebisacrylamide diacetoneacrylamide, maleic acid amide and maleimide; vinyl cyanide compounds such as acrylonitrile and methacrylonitrile; piperidine monomers such as 4-(meth)acryloyloxy-2,2,6,6,-tetramethylpiperidine, 4-(meth)acryloylamino-2,2,6,6-tetramethylpiperidine and 4-(meth)acryloyloxy-1,2,2,6,6-pentamethylpiperidine; besides, caprolactone; and so forth.

Further, functional group-containing components (B) include, for example, unsaturated carboxylic acids other than above such as crotonic acid, maleic acid, fumaric acid and itaconic acid; unsaturated carboxylic acid anhydrides such as maleic anhydride and itaconic anhydride; hydroxyl group-containing vinyl monomers other than the above such as N-methylol(meth)acrylamide and 2-hydroxyethyl vinyl ether; amino group-containing vinyl monomers such as 2-aminoethyl vinyl ether; amineimido group-containing vinyl monomers such as 1,1,1-trimethylamine(meth) acrylimide, 1-methyl-1-ethylamine(meth)acrylimide, 1,1-dimethyl-1-(2-hydroxypropyl)amine(meth)acrylimide, 1,1-dimethyl-1-(2'-phenyl-2'-hydroxyethyl)amine(meth) acrylimide and 1,1-dimethyl-1-(2'-hydroxy-2'-phenoxypropyl)amine(meth)acrylimide; epoxy group-containing vinyl monomers other than the above such as allyl glycidyl ether; and so forth.

Of the above-mentioned components (B), (meth)acrylic compounds are preferred, and (meth)acrylic acid, (meth) acrylates and hydroxyl group-containing (meth)acrylates are particularly preferred among others.

More preferred are methyl methacrylate, butyl methacrylate, acrylic acid and 2-hydroxyethyl methacrylate.

The use of the unsaturated carboxylic acid-containing radical polymerizable monomer in component (B) are preferred, because it improves polymerization stability and compounding stability in dye compounding, and further also shows an excellent effect as component (D) described later. The content of the unsaturated carboxylic acid-containing radical polymerizable monomer in component (B) is usually 5% by weight or less, and preferably from about 0.1% to about 3% by weight.

For the ratio of component (A) to component (B) in the aqueous dispersion of the present invention, the total amount of component (A) (converted to a completely hydrolyzed condensate) is from 1 to 95 parts by weight, and preferably from 10 to 90 parts by weight, and the amount of component (B) is from 99 to 5 parts by weight, and preferably from 90 to 10 parts by weight (with the proviso that (A)+(B)=100 parts by weight).

Less than 5 parts by weight of component (B) is unfavorable, because film forming properties and resistance to cracks are deteriorated. On the other hand, exceeding 99 parts by weight is unfavorable, because deterioration of resistance to weather becomes significant.

Production of Aqueous Dispersion

The aqueous dispersion of the present invention is obtained by emulsifying a mixture containing the above-mentioned component (A) and component (B) in the presence of water, an emulsifier and optionally hydrolytic/condensation catalyst (D), and then, adding a radical polymerization initiator and optionally hydrolytic/condensation catalyst (D) to conduct hydrolysis/condensation and radical polymerization.

In this condensation/polymerization reaction, hydrolysis/(co-)condensation of component (A) (preferably, the mixture of the organosilane and the polyorganosiloxane) and radical polymerization of radical polymerizable vinyl monomer (B) proceed at the same time in the emulsified state. The reaction at the time when component (A) is the mixture of the organosilane and the polyorganosiloxane includes the case that the organosilane and the polyorganosiloxane are each independently condensed, as well as co-condensation of the above-mentioned two kinds of components. As a result, the siloxane component composed of component (A) and the vinyl polymer composed of component (B) form the interpenetrating network structure. Further, polymer molecules are entangled with one another in a solventless state in an emulsion particle, so that the degree of freedom of a condensation activity-rich silanol group contained in the siloxane component is limited. As a result, the condensation of the silanol group is inhibited to give good storage stability.

Water used for the production of the aqueous dispersion of the present invention may be either water existing in an aqueous mixed solution of component (A) previously added, or water further added to the mixture of component (A) together with the emulsifier.

The amount of water used is usually from 30 to 2,000 parts by weight, preferably from 80 to 1,000 parts by weight, and more preferably from 100 to 500 parts by weight, based on 100 parts by weight of the total amount of component (A) (converted to a completely hydrolyzed condensate) and component (B). Less than 50 parts by weight is unfavorable, because emulsification is difficult, or the stability of an emulsion after emulsification is lowered. On the other hand, exceeding 2,000 parts by weight results in an unfavorable reduction in productivity.

As surfactants used as the emulsifiers include, there can be used, for example, any of anionic surfactants such as alkylsulfate ester salts, alkylarylsulfate ester salts, alkylphosphate ester salts and fatty acid salts; cationic surfactants such as alkylamine salts and alkyl quaternary amine salts; nonionic surfactants such as polyoxyethylene alkyl ethers, polyoxyethylene alkyl aryl ethers and block type polyethers; amphoteric surfactants such as carboxylic type surfactants (for example, amino acid type, betaine type and so forth) and sulfonic acid type surfactants; reactive emulsifiers such as Latemul S-180A (manufactured by KAO CORPORATION), Eleminol JS-2 (manufactured by SANYO CHEMICAL INDUSTRIES, LTD.), Aqualon HS-10 (manufactured by DAI-ICHI KOGYO SEIYAKU CO., Ltd.), ADEKA REASOAP SE-10N (manufactured by ASAHI DENKA KOGYO K.K.), Antox MS-60 (manufactured by Nippon Nyukazai Co., Ltd.) and so forth in trade names.

In particular, the use of the reactive emulsifiers is preferred because of excellent resistance to weather and resistance to water.

These emulsifiers may be used either alone or as a combination of two or more of them.

The amount of the emulsifiers used is usually from 0.1 to 5 parts by weight, preferably from 0.2 to 4 parts by weight, and more preferably from 0.5 to 4 parts by weight, based on 100 parts by weight of the total amount of component (A) (converted to a completely hydrolyzed condensate) and component (B). Less than 0.1 part by weight unfavorably results in insufficient emulsification and deteriorated stability in hydrolysis/condensation and radical polymerization. On the other hand, exceeding 5 parts by weight is unfavorable, because the problem of foaming is encountered.

Further, in this condensation/polymerization reaction, radical polymerization initiators are used. As the radical polymerization initiators, there can be used aqueous initiators such as persulfates such as potassium persulfate, sodium persulfate and ammonium persulfate, hydrogen peroxide, t-butyl hydroperoxide, t-butyl peroxy maleic acid, succinic peroxide and 2,2'-azobis[2-N-benzylamidino]propane hydrochloride; oil-soluble initiators such as benzoyl peroxide, cumene hydroperoxide, diisopropyl peroxydicarbonate, cumyl peroxyneodecanoate, cumyl peroxyoctoate and azobisisobutyronitrile; redox initiators in which reducing agents such as sodium hydrogen sulfite, Rongalite and ascorbic acid are used together; and so forth.

Of these radical polymerization initiators, the water-soluble initiators are preferred from the viewpoint of polymerization stability.

The amount of these radical polymerization initiators used is from 0.01 to 5 parts by weight, preferably from 0.05 to 4 parts by weight, and more preferably from 0.1 to 3 parts by weight, based on 100 parts by weight of the total amount of component (A) (converted to a completely hydrolyzed condensate) and component (B). Less than 0.01 part by weight sometimes results in deactivation of the radical polymerization reaction in the course thereof, whereas exceeding 5 parts by weight results in poor resistance to weather in some cases.

The aqueous dispersion of the present invention is obtained preferably by mixing the above-mentioned components (A) and (B), water and emulsifier, and further optionally hydrolytic/condensation catalyst (D) (a hardening accelerator) described later to form an emulsion, allowing the hydrolysis/condensation reaction of component (A) to proceed as needed (hereinafter also referred to as "emulsification"), reducing the average particle size of the emulsion to 0.5 $\mu$m or less (hereinafter also referred to as "particle size reduction"), and then, adding the above-mentioned radical polymerization initiator and optionally component (D) to conduct hydrolysis/condensation and radical polymerization (hereinafter also referred to as "condensation/polymerization reaction).

Here, the conditions of emulsification require only that the mixture of the above-mentioned components (A) and (B), water and emulsifier (further, the hydrolysis/condensation catalyst as needed) is stirred visually in a homogeneously mixed state under such a temperature and pressure that the mixture is in a liquid state.

This emulsification homogenizes the above-mentioned mixture to form the emulsion, and allows the hydrolysis/condensation of component (A) to proceed as needed.

In the particle size reduction, the aqueous emulsion is minutely emulsified by use of mechanical means such as a high pressure homogenizer and an ultrasonic wave. In this case, the average particle size of the emulsion is reduced to 0.5 $\mu$m or less, preferably 0.05 to 0.2 $\mu$m. Exceeding 0.5 $\mu$m unfavorably results in poor resistance to water.

Further, in the condensation/polymerization reaction, hydrolysis/(co-)condensation of component (A) (preferably, the mixture of the organosilane and the polyorganosiloxane) and radical polymerization of radical polymerizable monomer (B) proceed at the same time in the emulsified state. The reaction at the time when component (A) is the mixture of the organosilane and the polyorganosiloxane includes the case that the organosilane and the polyorganosiloxane are each independently condensed, as well as co-condensation of the above-mentioned two kinds of components. As a result, the siloxane component composed of component (A) and the vinyl polymer composed of component (B) form the interpenetrating network structure. Further, polymer molecules are entangled with one another in a solventless state in an emulsion particle, so that the degree of freedom of a condensation activity-rich silanol group contained in the siloxane component is limited. As a result, the condensation of the silanol group is inhibited to give good storage stability.

As to the reaction conditions of the condensation/polymerization reaction in this case, the temperature is usually from 25 to 80° C., and preferably from 40 to 70° C., and the reaction time is usually from 0.5 to 15 hours, and preferably from 1 to 8 hours.

When component (A) or component (B) contains an acidic group such as a carboxyl group or a carboxylic acid anhydride group in the condensation/polymerization reaction, it is preferred that at least one basic compound is added after the condensation/polymerization reaction in order to adjust the pH. On the other hand, when each component described above has a basic group such as an amino group or an amineimido group, it is preferred that at least one acidic compound is added after the condensation/polymerization reaction in order to adjust the pH. Further, when each component described above has an acidic group and a basic group, at least one basic compound or acidic compound is added according to the ratio of these groups after the condensation/polymerization reaction in order to adjust the pH, thereby enabling to enhance the hydrophilicity of the aqueous dispersion and improve the dispersibility.

The above-mentioned basic compounds include, for example, amines such as ammonia, methylamine, dimethylamine, trimethylamine, ethylamine, diethylamine, triethylamine, ethanolamine, diethanolamine and dimethylaminoethanol; alkaline metal hydroxides such as potassium hydroxide and sodium hydroxide; and so forth. The above-mentioned acidic compounds include, for example, inorganic acids such as hydrochloric acid, phosphoric acid, sulfuric acid and nitric acid; and organic acids such as formic acid, acetic acid, propionic acid, lactic acid, oxalic acid, citric acid, adipic acid, (meth)acrylic acid, maleic acid, fumaric acid and itaconic acid.

The pH value of the aqueous dispersion in the above-mentioned pH adjustment is usually from 6 to 10, and preferably from 7 to 8.

In the aqueous dispersion of the present invention, the organic inorganic complex is dispersed in the aqueous medium. The dispersed state thereof can be a particle state or an aqueous sol state. In this case, the average particle size of the organic inorganic complex of the present invention is usually from 0.01 to 100 $\mu$m, and preferably from 0.05 to 10 $\mu$m.

The solid concentration of the aqueous dispersion of the present invention is usually from 10% to 60% by weight, and preferably from 20% to 50% by weight. This solid concentration is usually adjusted by the amount of the above-mentioned water.

Although the aqueous medium in the aqueous dispersion of the present invention is essentially composed of water, it may contain an organic solvent such as an alcohol in an amount of up to about several percent by weight according to the case.

Further, when the organic solvent optionally used in preparing the above-mentioned component (A) is contained in the aqueous dispersion of the present invention, this organic solvent can also be previously removed from the aqueous dispersion.

Furthermore, the above-mentioned various organic solvents optionally used in preparing component (A) can also be added to the aqueous dispersion of the present invention.

The following silane coupling agent (C) and hydrolysis/condensation catalyst (hardening accelerator) (D) can also be added to the aqueous dispersion of the present invention.

Silane Coupling Agent (C)

Silane coupling agent (C) is a compound having a polymerizable unsaturated group radically polymerizable with vinyl monomer (B), and a group which can form a siloxane bond such as an alkoxysilyl group co-condensable with component (A).

Addition of silane coupling agent (C) to the aqueous dispersion of the present invention improves the hybridity of the organic component and the inorganic component of the aqueous dispersion of the present invention, so that resistance to cracks in film formation, transparency and resistance to weather are improved.

For the addition of silane coupling agent (C), it may be added to the mixed solution of the above-mentioned component (A) and component (B) before emulsification, or in the above-mentioned condensation/polymerization, or after the preparation of the aqueous dispersion of the present invention. It is preferred that silane coupling agent (C) is added to the mixed solution of the above-mentioned component (A) and component (B) before emulsification.

Specific examples of silane coupling agents (C) include $CH_2$=$CHSi(CH_3)(OCH_3)_2$, $CH_2$=$CHSi(OCH_3)_3$, $CH_2$=$CHSi(CH_3)Cl_2$, $CH_2$=$CHSiCl_3$, $CH_2$=$CHCOO(CH_2)_2Si(CH_3)(OCH_3)_2$, $CH_2$=$CHCOO(CH_2)_2Si(OCH_3)_3$, $CH_2$=$CHCOO(CH_2)_3Si(CH_3)(OCH_3)_2$, $CH_2$=$CHCOO(CH_2)_3Si(OCH_3)_3$, $CH_2$=$CHCOO(CH_2)_2Si(CH_3)Cl_2$, $CH_2$=$CHCOO(CH_2)_2SiCl_3$, $CH_2$=$CHCOO(CH_2)_3Si(CH_3)Cl_2$, $CH_2$=$CHCOO(CH_2)_3SiCl_3$, $CH_2$=$C(CH_3)COO(CH_2)_2Si(CH_3)(OCH_3)_2$, $CH_2$=$C(CH_3)COO(CH_2)_2Si(OCH_3)_3$, $CH_2$=$C(CH_3)COO(CH_2)_3Si(CH_3)(OCH_3)_2$, $CH_2$=$C(CH_3)COO(CH_2)_3Si(OCH_3)_3$, $CH_2$=$C(CH_3)COO(CH_2)_2Si(CH_3)Cl_2$, $CH_2$=$C(CH_3)COO(CH_2)_2SiCl_3$, $CH_2$=$C(CH_3)COO(CH_2)_3Si(CH_3)Cl_2$, $CH_2$=$C(CH_3)COO(CH_2)_3SiCl_3$ and so forth.

The amount of silane coupling agent (C) added is usually 20 parts by weight or less, and preferably 10 parts by weight, based on 100 parts by weight of the total amount of component (A) (converted to a completely hydrolyzed condensate) and component (B).

Hydrolysis/Condensation Catalyst (Hardening Accelerator) (D)

Component (D) is a catalyst for enhancing the hydrolysis/condensation reaction of component (A).

The use of component (D) accelerates the speed of curing the resultant coating film and increases the molecular weight of a polysiloxane resin produced by the polycondensation reaction of component (A) used. Consequently, the coating film excellent in physical strength, long-term durability and so forth can be obtained, and an increase in thickness of the coating film and the coating operation also become easy.

As such component (D), acidic compounds, alkaline compounds, salt compounds, amine compounds, organometallic compounds and/or their partial hydrolyzates (the orga-nometallic compounds and/or their partial hydrolyzates are hereinafter collectively referred to as "organometallic compounds, etc.") are preferred.

The above-mentioned acidic compounds include, for example, (meth)acrylicacid, aceticacid, hydrochloricacld, sulfuric acid, phosphoric acid, an alkyltitanic acid, p-toluenesulphonic acid, phthalic acid and so forth, and preferred is acetic acid.

Further, the above-mentioned alkaline compounds include, for example, sodium hydroxide, potassium hydroxide and so forth, and preferred is sodium hydroxide.

Still further, the above-mentioned salt compounds include, for example, alkaline metal salts of naphthenic acid, octylic acid, nitrous acid, sulfurous acid, aluminic acid, carbonic acid and so forth.

Furthermore, the above-mentioned amine compounds include, for example, ethylenediamine, hexamethylenediamine, diethylenetriamine, triethylenetetramine, tetraethylenepentamine, piperidine, piperadine, m-phenylenediamine, p-phenylenediamine, ethanolamine, triethylamine, 3-aminopropyl.trimethoxysilane, 3-aminopropyl.triethoxysilane, 3-(2-aminoethyl)-aminopropyl.trimethoxysilane, 3-(2-aminoethyl)-aminopropyl.triethoxysilane, 3-(2-aminoethyl)-aminopropyl.methyl.dimethoxysilane, 3-anilinopropyl.trimethoxysilane, various modified amines used as hardeners for epoxy resins and so forth, as well as alkylamine salts and quaternary ammonium salts. Preferred are 3-aminopropyl.trimethoxysilane, 3-aminopropyl.triethoxysilane and 3-(2-aminoethyl)-aminopropyl.trimethoxysilane.

The above-mentioned organometallic compounds, etc. include, for example, a compound expressed by the following general formula (2) (hereinafter referred to as "organometallic compound (2)"), an organometallic compound of tetravalent tin having 1 or 2 alkyl groups of 1 to 10 carbon atoms bonded to the same tin atom (hereinafter referred to as an "organic tin compound") and their partial hydrolyzates.

$$M(OR^3)_r(R^4COCHCOR^5)_s \qquad (2)$$

(wherein, M indicates zirconium, titanium or aluminum, $R^3$ and $R^4$, which may be the same or different, each indicate a monovalent hydrocarbon group having 1 to 6 carbon atoms such as ethyl, n-propyl, i-propyl, n-butyl, sec-butyl, t-butyl, n-pentyl, n-hexyl, cyclohexyl or phenyl, $R^5$ indicates an alkoxyl group having 1 to 16 carbon atoms such as methoxy, ethoxy, n-propoxy, i-propoxy, n-butoxy, sec-butoxy, t-butoxy, lauryloxy or stearyloxy, as well as a monovalent hydrocarbon group of 1 to 6 carbon atoms having the same meaning as given for $R^3$ or $R^4$, and r and s are integers ranging from 0 to 4 and (r+s)=(valence of M).)

Specific examples of organometallic compounds (2) include (a) organozirconium compounds such as tetra-n-butoxyzirconium, zirconium tri-n-butoxy.ethylacetoacetate, zirconium di-n-butoxy.bis(ethylacetoacetate), zirconium n-butoxy.tris(ethylacetoacetate), zirconium tetrakis(n-propylacetoacetate), zirconium tetrakis(acetylacetoacetate) and zirconium tetrakis(ethylacetoacetate);

(b) organotitanium compounds such as tetra-i-propoxytitanium, titanium di-i-propoxy.bis (ethylacetoacetate), titanium di-i-propoxy.bis(acetylacetate) and titanium di-i-propoxy.bis(acetylacetone);

(c) organoaluminum compounds such as tri-i-propoxyaluminum, aluminum di-i- propoxy.ethylacetoacetate, aluminum di-i-propoxyacetylacetonate, aluminum i-propoxy.bis(ethylacetoacetate), aluminum i-propoxy.bis(acetylacetonate), aluminum tris(ethylacetoacetate), aluminum tris(acetylacetonate) and aluminum monoacetylacetonate.bis(ethylacetoacetate); and so forth.

Of these organometallic compounds (2) and their partial hydrolyzates, preferred are zirconium tri-n-butoxy.ethylacetoacetate, titanium di-i-propoxy.bis(acetylacetonate), aluminum di-i-propoxy.ethylacetoacetate, aluminum tris(ethylacetoacetate) or the partial hydolyzates of these compounds.

Further, specific examples of the organotin compounds include carboxylic acid type organotin compounds such as $(C_4H_9)_2Sn(OCOC_{11}H_{23})_2$, $(C_4H_9)_2Sn(OCOCH=CHCOOCH_3)_2$, $(C_4H_9)_2SN(OCOCH=CHCOOC_4H_9)_2$, $(C_8H_{17})_2Sn(OCOC_8H_{17})_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $(C_8H_{17})_2Sn(OCOCH=CHCOOC_{16}H_{33})_2$, $(C_8H_{17})_2Sn(OCOCH=CHCOOC_{17}H_{35})_2$, $(C_8H_{17})_2Sn(OCOCH=CHCOOC_{18}H_{37})_2$, $(C_8H_{17})_2Sn(OCOCH=CHCOOC_{20}H_{41})_2$,

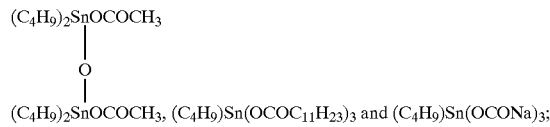

$(C_4H_9)_2SnOCOCH_3$, $(C_4H_9)Sn(OCOC_{11}H_{23})_3$ and $(C_4H_9)Sn(OCONa)_3$;

mercaptide type organotin compounds such as $(C_4H_9)_2Sn(SCH_2COOC_8H_{17})_2$; $(C_4H_9)_2Sn(SCH_2CH_2COOC_8H_{17})_2$, $(CH_8H_{17})_2Sn(SCH_2COOC_8H_{17})_2$, $(C_8H_{17})_2Sn(SCH_2CH_2COOC_8H_{17})_2$, $(C_8H_{17})_2Sn(SCH_2COOC_{12}H_{25})_2$, $(C_8H_{17})_2Sn(SCH_2CH_2COOC_{12}H_{25})_2$, $(C_4H_9)Sn(SCOCH=CHCOOC_8H_{17})_3$, $(C_8H_{17})Sn(SCOCH=CHOOC_8H_{17})_3$ and

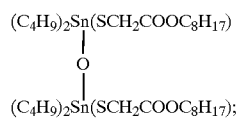

sulfide type organotin compounds such as $(C_4H_9)Sn=S$, $(C_8H_{17})_2Sn=S$ and

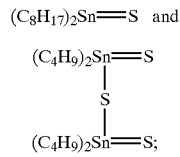

chloride type organotin compounds such as $(C_4H_9)SnCl_3$, $(C_4H_9)_2SnCl_2$, $(C_8H_{17})_2SnCl_2$ and

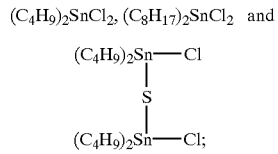

organotin oxides such as $(C_4H_9)_2SnO$ and $(C_8H_{17})_2SnO$, and reaction products of these organotin oxides and ester compounds such as a silicate, dimethyl maleate, diethyl maleate and dioctyl phthalate; and so forth.

When an unsaturated carboxylic acid such as acrylic acid or methacrylic acid is used as component (D), it is copolymerized as component (B). Accordingly, the effect of not deteriorating resistance to weather and resistance to water is obtained.

The above components (D) can be used alone or as a mixture of two or more of them, and can also be used as a mixture with a zinc compound or another reaction retardant.

Component (D) may also be added in preparing the aqueous dispersion or at a stage where a coating film is formed or at both the stages of the preparation of the aqueous dispersion and the formation of the coating film.

The amount of component (D) used varies depending on the case that component (D) is added in preparing the aqueous dispersion and the case that component (D) is added after the preparation thereof.

That is to say, when component (D) is added in preparing the aqueous dispersion, the amount of component (D) used is usually from 0.01 to 5 parts by weight, preferably from 0.1 to 5 parts by weight, and more preferably from 0.1 to 3 parts by weight, based on 100 parts by weight of the total amount of the above-mentioned component (A) (converted to a completely hydrolyzed condensate) and component (B). When the amount of component (D) is less than 0.01 part by weight, the hydrolysis/condensation reaction of component (A) is insufficient in some cases. On the other hand, when it exceeds 5 parts by weight, the aqueous dispersion tends to deteriorate in storage stability, or cracks are liable to occur in the coating film.

Meanwhile, when component (D) is added after the preparation the aqueous dispersion, in the case of components other than the organometallic compounds, etc., the amount of component (D) used is usually 100 parts by weight or less, preferably from 0.01 to 80 parts by weight, and more preferably from 0.1 to 50 parts by weight, based on 100 parts by weight of the above-mentioned component (A) (converted to a completely hydrolyzed condensate). In the case of the organometallic compounds, etc., the amount of component (D) used is usually 100 parts by weight or less, preferably from 0.1 to 80 parts by weight, and more preferably from 0.5 to 50 parts by weight, based on 100 parts by weight of the above-mentioned component (A) (converted to a completely hydrolyzed condensate). In this case, when the amount of component (D) used exceeds 100 parts by weight, the aqueous dispersion tends to deteriorate in storage stability, or cracks are liable to occur in the coating film.

Other Silicone Resins (E)

Other silicone resins other than the above-mentioned component (A) can be added to the aqueous dispersions of the present invention. The other silicone resins include (E-1) a silyl group-containing polymer and (E-2) an aqueous dispersion in which a hybrid of a polyorganosiloxane and a silyl group-containing polymer is dispersed in an aqueous medium (hereinafter also referred to as a "hybrid type aqueous dispersion").

These other silicone resins (E) can be used either alone or as a combination of two or more of them.

Silyl group-containing polymer (E-1) and hybrid type aqueous dispersion (E-2) will be described below.

Silyl Group-Containing Polymer (E-1);

Component (E-1) is a polymer having a silyl group having a silicon atom binding to a hydrolytic group and/or a hydroxyl group (hereinafter also referred to as a "specific silyl group"), preferably at an end and/or a side chain of a molecular chain of the polymer. This component (E-1) is a component bringing about an excellent coating film performance by co-condensation of the hydrolytic group and/or the hydroxyl group in the silyl group with the above-mentioned component (A) in hardening the coating film. The amount of silicon atom contained in component (E-1) is generally from 0.001 to 20% by weight, and preferably from 0.01 to 15% by weight, based on the total of component (E-1).

The preferred specific silyl group is a group expressed by the following general formula (3):

(3)

(wherein, X indicates a hydrolytic group or hydroxyl group such as a halogen atom, an alkoxyl group, an acetoxy group, a phenoxy group, a thioalkoxyl group or an amino group, $R^6$ indicates a hydrogen atom, an alkyl group having 1 to 10 carbon atoms or an aralkyl group having 1 to 10 carbon atoms, and i is an integer of from 1 to 3).

Component (E-1) can be produced, for example, by the following methods of (a) and (b):

(a) A method of allowing a hydrosilane compound corresponding to the above-mentioned general formula (3) (hereinafter referred to as "hydrosilane compound (a)") to react with a carbon-carbon double bond of a carbon-carbon double bond-containing vinyl polymer (hereinafter referred to as an "unsaturated vinyl polymer") by the addition reaction; and (b) A method of copolymerizing a silane compound expressed by the following general formula (4) (hereinafter referred to as "unsaturated silane compound (b)") with another vinyl monomer.

(4)

(wherein X, $R^6$ and i each have the same meanings as given for X, $R^6$ and i in general formula (4), and $R^7$ indicates an organic group having a polymerizable double bond).

Hydrosilane compounds (a) used in the above-mentioned method of (a) include, for example, halogenated silanes such as methyldichlorosilane, trichlorosilane and phenyldichlorosilane; alkoxysilanes such as methyldimethoxysilane, methyldiethoxysilane, phenyldimethoxysilane, trimethoxysilane and triethoxysilane; acyloxysilanes such as methyldiacetoxysilane, phenyldiacetoxysilane and triacetoxysilane, aminoxysilanes such as methyldiaminoxysilane, triaminoxysilane and dimethylaminoxysilane; and so forth.

These hydrosilane compounds (a) may be used alone or as a mixture of two or more of them.

There is no particular limitation on the unsaturated vinyl polymer used in the above-mentioned method of (a), as long as it is a polymer extruding a hydroxyl group-containing polymer, and it can be produced, for example, by the following methods of (a-1) and (a-2), or the combination thereof:

(a-1) A method of (co)polymerizing a vinyl monomer having a functional group (hereinafter referred to as "functional group (α)"), and then, allowing an unsaturated compound having a functional group reactable with functional group (α) (hereinafter referred to as "functional group (β)") and a carbon-carbon double bond to react with functional group (a) in the (co)polymer, thereby producing the unsaturated vinyl polymer having a carbon-carbon double bond at a side chain of a molecular chain of the polymer; and (a-2) A method of (co)polymerizing a vinyl monomer using a functional group (α)-containing radical polymerization initiator (for example, 4,4-azobis-4-cyanovaleric acid or the like), or using functional group (α)-containing compounds (for example, 4,4-azobis-4-cyanovaleric acid and thioglycolic acid or the like) for both a radical polymerization initiator and a chain transfer agent to synthesize a (co)polymer having functional group (α) derived from the radical polymerization initiator and/or the chain transfer agent at one end or both ends of a molecular chain of the polymer, and then, allowing an unsaturated compound having functional group (β) and a carbon-carbon double bond to react with functional group (α) in the (co)polymer, thereby producing the unsaturated vinyl polymer having a carbon-carbon double bond at one end or both ends of a molecular chain of the polymer.

Examples of the reactions of functional group (α) and functional group (β) in the methods of (a-1) and (a-2) include an esterification reaction of a carboxyl group and a hydroxyl group, a ring opening esterification reaction of a carboxylic anhydride group and a hydroxyl group, a ring opening esterification reaction of a carboxyl group and an epoxy group, an amidation reaction of a carboxyl group and an amino group, a ring opening amidation reaction of a carboxylic anhydride group and an amino group, a ring opening addition reaction of an epoxy group and an amino group, a urethanation reaction of a hydroxyl group and an isocyanate group, a combination of these reactions, and so forth.

The functional group (α)-containing vinyl monomers include, for example, unsaturated carboxylic acids such as (meth)acrylic acid, crotonic acid, maleic acid, fumaric acid and itaconic acid; unsaturated carboxylic acid anhydrides such as maleic anhydride and itaconic anhydride; hydroxyl group-containing vinyl monomers such as 2-hydroxyethyl (meth)acrylate, 2-hydroxypropyl (meth)acrylate, 3-hydroxypropyl (meth)acrylate, N-methylol(meth)acrylamide and 2-hydroxyethyl vinyl ether; amino group-containing vinyl monomers such as 2-aminoethyl (meth)acrylate, 2-aminopropyl (meth)acrylate, 3-aminopropyl (meth)acrylate and 2-aminoethyl vinyl ether; amineimido group-containing vinyl monomers such as 1,1,1-trimethylamine(meth)acrylimide, 1-methyl-1-ethylamine (meth)acrylimide, 1,1-dimethyl-1-(2-hydroxypropyl)amine (meth)acrylimide, 1,1-dimethyl-1-(2'-phenyl-2'-hydroxyethyl)amine(meth)acrylimide and 1,1-dimethyl-1-(2'-hydroxy-2'-phenoxypropyl)amine(meth)acrylimide; epoxy group-containing vinyl monomers such as glycidyl (meth)acrylate and allyl glycidyl ether; and so forth.

These functional group (α)-containing vinyl monomers can be used either alone or as a mixture of two or more of them.

The other vinyl monomers copolymerizable with the functional group (α)-containing vinyl monomers include, for example, dicaprolactone and so forth, as well as (a) aromatic vinyl monomers such as styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 3,4-diethylstyrene, 2-chlorostyrene, 3-chlorostyrene, 4-chloro-3-methylstyrene, 4-t-butylstyrene, 2,4-dichlorostyrene, 2,6-dichlorostyrene and 1-vinylnaphthalene;

(b) (meth)acrylate compounds such as methyl (meth)acrylate, ethyl (meth)acrylate, propyl (meth)acrylate, n-butyl (meth)acrylate, i-butyl (meth)acrylate, amyl (meth)acrylate, i-amyl (meth)acrylate, hexyl (meth)acrylate, 2-ethylhexyl (meth)acrylate, n-octyl (meth)acrylate and cyclohexyl (meth)acrylate;

(c) multifunctional monomers such as divinylbenzene, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, tetrapropylene glycol di(meth)acrylate, butanediol di(meth)acrylate, hexanediol di(meth)acrylate, trimethylolpropane tri(meth)acrylate and pentaerythritol tetra(meth)acrylate;

(d) acid amide compounds such as (meth)acrylamide, N-methylol(meth)acrylamide, N-methoxymethyl(meth)acrylamide, N-butoxymethyl(meth)acrylamide, N,N'-methylenebisacrylamide, diacetoneacrylamide, maleic acid amide and maleimide;

(e) vinyl compounds such as vinyl chloride, vinylidene chloride and fatty acid vinyl esters;

(f) aliphatic conjugated dienes such as 1,3-butadiene, 2-methyl-1,3-butadinene, 2,3-dimethyl-1,3-butadiene, 2-neopentyl-1,3-butadinene, 2-chloro-1,3-butadinene, 2-cyano-1,3-butadinene, isoprene, substituted straight-chain conjugated pentadiene substituted by a substituent group such as an alkyl group, a halogen atom or a cyano group, and straight-chain or side-chain conjugated hexadiene;

(g) vinyl cyanide compounds such as acrylonitrile and methacrylonitrile;

(h) fluorine atom-containing monomers such as trifluoroethyl (meth)acrylate and pentadecafluorooctyl (meth)acrylate; and (i) piperidine monomers such as 4-(meth)acryloyloxy-2,2,6,6,-tetramethylpiperidine, 4-(meth)acryloylamino-2,2,6,6-tetramethylpiperidine and 4-(meth) acryloyloxy-1,2,2,6,6-pentamethylpiperidine.

These can be used either alone or as a combination of two or more of them.

The functional group (β)- and carbon-carbon double bond-containing unsaturated compounds include, for example, vinyl monomers similar to the functional group (α)-containing vinyl monomers, isocyanate group-containing unsaturated compounds obtained by reacting the above-mentioned hydroxyl group-containing vinyl monomers with diisocyanate compounds in equimolar amounts, and so forth.

Specific examples of unsaturated silane compounds (b) used in the above-mentioned method of (b) include $CH_2=CHSi(CH_3)(OCH_3)_2$, $CH_2=CHSi(OCH_3)_3$, $CH_2=CHSi(CH_3)Cl_2$, $CH_2=CHSiCl_3$, $CH_2=CHCOO(CH_2)_2Si(CH_3)(OCH_3)_2$, $CH_2=CHCOO(CH_2)_3Si(OCH_3)_3$, $CH_2=CHCOO(CH_2)_3Si(CH_3)(OCH_3)_2$, $CH_2=CHCOO(CH_2)_3Si(OCH_3)_3$, $CH_2=CHCOO(CH_2)_2Si(CH_3)Cl_2$, $CH_2=CHCOO(CH_2)_2SiCl_3$, $CH_2=CHCOO(CH_2)_3Si(CH_3)Cl_2$, $CH_2=CHCOO(CH_2)_3SiCl_3$, $CH_2=C(CH_3)COO(CH_2)_2Si(CH_3)(OCH_3)_2$, $CH_2=C(CH_3)COO(CH_2)_2Si(OCH_3)_3$, $CH_2=C(CH_3)COO(CH_2)_3Si(CH_3)(OCH_3)_2$, $CH_2=C(CH_3)COO(CH_2)_3Si(OCH_3)_3$, $CH_2=C(CH_3)COO(CH_2)_2Si(CH_3)Cl_2$, $CH_2=C(CH_3)COO(CH_2)_2SiCl_3$, $CH_2=C(CH_3)COO(CH_2)_3Si(CH_3)Cl_2$, $CH_2=C(CH_3)COO(CH_2)_3SiCl_3$,

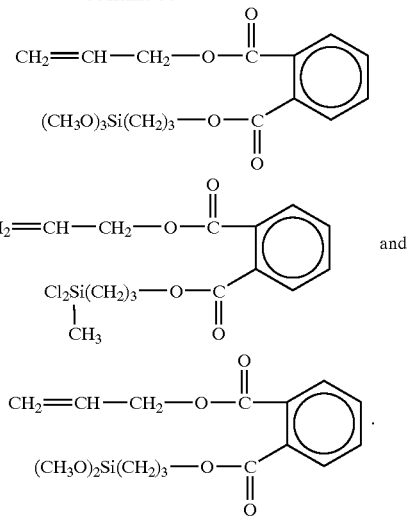

These can be used either alone or as a combination of two or more of them.

The other vinyl monomers copolymerized with unsaturated silane compounds (b) include, for example, the functional group (α)-containing vinyl monomers exemplified for the above-mentioned method of (a-1) and one or more of other vinyl monomers and so forth.

Further, other examples of components (E-1) include specific silyl group-containing epoxy resins, specific silyl group-containing polyester resins and so forth.

The above-mentioned specific silyl group-containing epoxy resins can be produced, for example, by allowing specific silyl group-containing aminosilanes, vinylsilanes, carboxysilanes and so forth to react with epoxy groups in epoxy resins such as bisphenol A type epoxy resins, bisphenol F type epoxy resins, hydrogenated bisphenol A type epoxy resins, aliphatic polyglycidyl ethers and aliphatic polyglycidyl esters.

The above-mentioned specific silyl group-containing polyester resins can be produced, for example, by allowing specific silyl group-containing aminosilanes, carboxysilanes, glycidylsilanes and so forth to react with carboxyl groups and hydroxyl groups contained in polyester resins.

The Mw of component (E-1) is preferably from 2,000 to 100,000, and more preferably from 4,000 to 50,000.

The amount of component (E-1) used is usually 95 parts by weight or less, and preferably 50 parts by weight or less, based on 100 parts by weight of the total amount of component (A) (converted to a completely hydrolyzed condensate) and component (B).

Polymerization processes in producing the above-mentioned component (E-1) include, for example, a process of adding the monomer at once for polymerization, a process of polymerizing some of the monomer and then continuously or intermittently adding the remainder thereof, or a process of feeding the monomer in succession from the start of polymerization. Further, polymerization processes in which these polymerization processes are combined are also employed. Preferred examples of the polymerization processes include solution polymerization. As solvents used in solution polymerization, ordinary ones can be used. Of these, ketones and alcohols are preferred. In this polymerization, as a polymerizing initiator, a molecular weight modifier, a chelating agent and an inorganic electrolyte, there can be used known ones.

In the present invention, components (E-1) can be used either alone or as a mixture of two or more of them obtained as described above.

Hybrid Type Aqueous Dispersion (E-2);

Component (E-2) is a dispersion of a specific polymer composed of the polyorganosiloxane and the above-mentioned silyl group-containing polymer (E-1) in an aqueous medium. This specific polymer is dispersed, for example, in a particle state or an aqueous sol state. The average particle size of the granular polymer is usually from 0.001 to 100 µm, and preferably from 0.001 to 1 µm. Although the aqueous medium in the aqueous dispersion is essentially composed of water, it may contain an organic solvent such as an alcohol in an amount of up to about several percent by weight according to the case.

Component (E-2) is produced preferably by a method of hydrolyzing and/or condensing the organosilane and component (E-1) in an organic solvent in the presence of the above-mentioned organometailic compound, etc. and water, dispersing the resulting reaction solution in an aqueous medium, and subsequently removing the organic solvent.

In the above-mentioned method, the amount of water existing in hydrolysis and/or condensation is usually from 0.5 to 3.0 moles, and preferably from 0.5 to 2.0 moles, per mole of organosilane.

When the reaction product is dispersed in the aqueous medium in the above-mentioned method, a surfactant and so forth can be used.

As the above-mentioned surfactants, there can be used the same surfactants as used as the emulsifiers in the production of the aqueous dispersions of the present invention.

Preferred examples of the organic solvents used in the above-mentioned method include alcohols, aromatic hydrocarbons, ethers, ketones, esters and so forth, which are used in the production of the above-mentioned polyorganosiloxanes. These organic solvents can also be removed before the reaction solutions are dispersed in the aqueous media.

The reaction condition in hydrolysis and/or condensation in the above-mentioned method is usually from 40 to 70° C., and the reaction time is usually from 1 to 8 hours.

In the above-mentioned method, a pH adjustor can also be used in the above-mentioned method. The pH adjustors include the same pH adjustors as used in the production of the aqueous dispersions of the present invention.

The pH value in the pH adjustment in this case is also usually from 6 to 10, and preferably from 7 to 8.

The amount of component (E-2) used is usually 1,000 parts by weight or less, and preferably 200 parts by weight or less, based on 100 parts by weight of the total amount of the above-mentioned component (A) (converted to a completely hydrolyzed condensate) and component (B).

Component (F)

Component (F) is a powder and/or a sol or a colloid of an inorganic compound, and is added according to desired characteristics of the coating film. When component (F) is a sol or a colloid, the average particle size thereof is usually from about 0.001 to about 100 µm.

Specific examples of compounds constituting components (F) include $SiO_2$, $Al_2O_3$, AlGa, As, $Al(OH)_3$, $Sb_2O_5$, $Si_3N_4$, Sn—$In_2O_3$, Sb—$In_2O_3$, MgF, $CeF_3$, $CeO_2$, $3Al_2O_3$-$2SiO_2$, BeO, SiC, AlN, Fe, Co, Co—$FeO_x$, $CrO_2$, $Fe_4N$, $BaTiO_3$, BaO—$Al_2O_3$-$SiO_2$, Ba ferrite, $SmCO_5$, $YCO_5$, $CeCO_5$, $PrCO_5$, $Sm_2CO_{17}$, $Nd_2Fe_{14}B$, $Al_4O_3$, α-Si, $SiN_4$, CoO, Sb—$SnO_2$, $Sb_2O_5$, $MnO_2$, MnB, $Co_3O_4$, $Co_3B$, $LiTaO_3$, MgO, $MgAl_2O_4$, $BeAl_2O_4$, $ZrSiO_4$, ZnSb, PbTe, GeSi, $FeSi_2$, $CrSi_2$, $COSi_2$, $MnSi_{1.73}$, $Mg_2Si$, β-B, BaC, BP, $TiB_2$, $ZrB_2$, $HfB_2$, $Ru_2Si_3$, $TiO_2$ (rutile type), $TiO_3$, $PbTiO_3$, $Al_2TiO_5$, $Zn_2SiO_4$, $Zr_2SiO_4$, $2MgO_2$—$Al_2O_3$-$5SiO_2$, $Nb_2O_5$, $Li_2O$—$Al_2O_3$-$4SiO_2$, Mg ferrite, Ni ferrite, Ni—Zn ferrite, Li ferrite, Sr ferrite and so forth, as well as semiconductors having photocatalytic ability such as $TiO_2$, $TiO_3$, $SrTiO_3$, $FeTiO_3$, $WO_3$, $SnO_2$, $Bi_2O_3$, $In_2O_3$, ZnO, $Fe_2O_3$, $RuO_2$, CdO, CdS, CdSe, GaP, GaAs, $CdFeO_3$, $MoS_2$, $LaRhO_3$, GaN, CdP, ZnS, ZnSe, ZnTe, $Nb_2O_5$, $ZrO_2$, InP, GaAsP, InGaAlP, AlGaAs, PbS, InAs, PbSe and InSb.

These components (F) can be used alone or as a mixture of two or more of them.

As the existing form of component (F), there are a powder, an aqueous sol or colloid in which it is dispersed in water, or a solvent sol or colloid in which it is dispersed in a polar solvent such as isopropyl alcohol or a nonpolar solvent such as toluene. In the case of the solvent sol or colloid, it may be used after further dilution with water or the solvent depending on the dispersibility of the semiconductor, or may be used after surface treatment for improving the dispersibility.

When component (F) is the aqueous sol or colloid, or the solvent sol or colloid, the solid concentration is preferably 40% by weight or less.

As a method for adding component (F) to the aqueous dispersion, component (F) may be added after the preparation of the aqueous dispersion, or during the preparation of the aqueous dispersion to hydrolyze and condense component (F) together with the above-mentioned component (A) and so forth.

The amount of component (F) used is usually 500 parts by weight or less, and preferably from 0.1 to 400 parts by weight, in solid content, based on 100 parts by weight of the total amount of the above-mentioned component (A) (converted to a completely hydrolyzed condensate) and component (B).

Other Additives

A filler can also be separately added to and dispersed in the aqueous dispersion of the present invention, for coloring the resultant coating film, increasing the thickness thereof, and so forth.

Such fillers include, for example, water-insoluble organic pigments and inorganic pigments, granular, fibrous or scaly ceramics, metals and alloys, their metal oxides, hydroxides, carbides, nitrides and sulfides, and so forth other than the pigments.

Specific examples of the above-mentioned fillers include iron, copper, aluminum, nickel, silver, zinc, ferrite, carbon black, stainless steel, silicon dioxide, titanium dioxide for pigments, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, viridian, Guignet's green, cobalt chrome green, shale green, green soil, manganese green, pigment green, ultramarine, deep blue, rocky blue, cobalt blue, cerulean blue, copper borate, molybdenum blue, copper sulfide, cobalt purple, mars violet, manganese purple, pigment violet, lead suboxide, calcium plumbate, zinc yellow, lead sulfide, chrome yellow, yellow soil, cadmium yellow, strontium yellow, titanium yellow, litharge, pigment yellow, copper suboxide, cadmium red, selenium red, chrome vermilion, Indian red, zinc white, antimony white, basic lead sulfate, titanium white, lithopone, lead silicate, zirconium oxide, tungsten white, lead, zinc flower, Bantison white, lead phthalate, manganese white, lead sulfate, graphite, bone black, diamond black, Thermatomic black, plant black, potassium titanate whisker, molybdenum disulfide and so forth.

These fillers can be used alone or as a mixture of two or more of them. The amount of the filler used is usually 300 parts by weight or less based on 100 parts by weight of the total amount of the above-mentioned component (A) (converted to a completely hydrolyzed condensate) and component (B).

Further, another additive can be added to the aqueous dispersion of the present invention, as desired. Such additives include surfactants, silane coupling agents, titanium coupling agents, dyes and so forth, as well as dispersing agents such as poly(oxyethylene alkyl ethers), poly(oxyethylene alkyl phenyl ethers), poly(oxyethylene fatty acid esters), polycarboxylic acid type polymer surfactants, polycarboxylates, polyphosphates, polyacrylates, polyamide ester salts and polyethylene glycol; thickening agents such as cellulose derivatives such as methyl cellulose, ethyl cellulose, hydroxyethyl cellulose, hydroxypropyl cellulose and hydroxypropylmethyl cellulose, castor oil derivatives and ferrosilicates; inorganic foaming agents such as ammonium carbonate, ammonium bicarbonate, ammonium nitrite, sodium boron hydride and calcium azide; organic foaming agents such as azo compounds such as azobisisobutyronitrile, hydrazine compounds such as diphenylsulfone-3,3'-disulfohydrazine, semicarbazide compounds, triazole compounds and N-nitroso compounds; and so forth.

In particular, when the aqueous dispersion of the present invention is used for a composition for undercoating, an ultraviolet absorbing agent, an ultraviolet stabilizing agent and so forth may be added for the purpose of improving resistance to weather and durable adhesion. The ultraviolet absorbing agents include inorganic semiconductors such as ZnO, $TiO_2$ (exhibiting no photocatalytic ability) and $CeO_2$, and organic ultraviolet absorbing agents such as salicylic acid, benzophenone, benzotriazole, cyanoacrylate and triazine derivatives. The ultraviolet stabilizing agents include piperidine derivatives and so forth.

Also, a leveling agent can be added for more improving the coating performance of the aqueous dispersion of the present invention. Of such leveling agents, fluorine leveling agents (trade names, hereinafter the same) include, for example, BM1000 and BM1100 manufactured by BM-Chemie; Efca 772 and Efca 777 manufactured by Efca Chemicals; a Floren series manufactured by Kyoeisha Chemical; an FC series manufactured by SUMITOMO 3M LIMITED; a Fluonal TF series manufactured by Toho Chemical; and so forth, and silicone leveling agents include, for example, a BYK series manufactured by BYK Chemie; a Sshmego series manufactured by Sshmegmann; Efca 30, Efca 31, Efca 34, Efca 35, Efca 36, Efca 39, Efca 83, Efca 86 and Efca 88 manufactured by Efca Chemicals; and so forth. Ether or ester leveling agents include, for example, Carphynol manufactured by Nisshin Chemical; Emargen and Homogenol manufactured by KAO CORPORATION; and so forth.

The compounding of such a leveling agent improves the finished appearance of the coating film, and also allow the coating film to be formed uniformly as a thin film.

The amount of the leveling agent used is preferably 5% by weight or less, and more preferably 3% by weight or less, based on the aqueous dispersion (converted to solid content).

As to a method for adding the leveling agent, the leveling agent may be added in preparing the aqueous dispersion of the present invention, or may be added to the aqueous dispersion at a stage where a coating film is formed, or may be added at both the stages of the preparation of the aqueous dispersion and the formation of the coating film.

The aqueous dispersion of the present invention may be blended with another resin. The other resins include acrylic-urethane resins, epoxy resins, polyesters, acrylic resins, fluororesins, acrylic resin emulsions, epoxy resin emulsions, polyurethane emulsions, polyester emulsions and so forth.

The total solid concentration of the aqueous dispersion of the present invention prepared as described above, also containing the other components, is usually from 10 to 55% by weight, preferably from 15 to 50% by weight, and properly adjusted corresponding to the purpose of use. When the total solid concentration exceeds 45% by weight, the storage stability tends to deteriorate.

Coating Materials and Coated Products

The aqueous dispersions of the present invention can be used as coatings (coating materials), as such or by adding the additives of component (C) and later as described above, these aqueous dispersions of the present invention can be used not only as coating compositions for over coating, but also as coating compositions for undercoating.

In the above-mentioned coating material, it is preferred that an aqueous dispersion obtained by using an aldo group- and/or keto group-containing radical polymerizable monomer in an amount of 0.5 to 20% by weight, preferably in an amount of 1 to 10% by weight is used as component (B) and a crosslinking agent having two or more hydrazide groups is added before coating.

Aldo group- and/or keto group-containing radical polymerizable monomers (B) as used herein include, for example, diacetone (meth)acrylamide, a vinylalkyl ketone having 4 to 7 carbon atoms (for example, vinylmethyl ketone, vinylethyl ketone, vinyl-n-propyl ketone, vinyl-i-propyl ketone, vinyl-n-butyl ketone, vinyl-i-butyl ketone, vinyl-t-butyl ketone, etc.), vinylphenyl ketone, vinylbenzyl ketone, divinyl ketone, diacetone (meth)acrylate, acetonitrile (meth)acrylate, 2-hydroxypropyl (meth)acrylate-acetylacetate, 3-hydroxypropyl (meth)acrylate-acetylacetate, 2-hydroxybutyl(meth)acrylate-acetylacetate, 3-hydroxybutyl(meth)acrylate-acetylacetate, 4-hydroxybutyl(meth)acrylate-acetylacetate, butanediol-1,4 (meth)acrylate-acetylacetate and so forth.

Further, the crosslinking agents each having two or more hydrazide groups include, for example, a dicarobxylic acid dihydrazide having a total carbon number of 2 to 10, particularly 4 to 6, such as oxalic acid dihydrazide, malonic acid dihydrazide, succinic acid dihydrazide, glutaric acid dihydrazide, adipic acid dihydrazide, sebacic acid dihydrazide, phthalic acid dihydrazide, isophthalic acid dihydrazide, terephthalic acid dihydrazide, maleic acid dihydrazide, fumaric acid dihydrazide or itaconic acid dihydrazide; a trifunctional or more functional hydrazide such as citric acid trihydrazide, nitriloacetic acid trihydrazide, cyclohexanetricarboxylic acid trihydrazide or ethylenediaminetetraacetic acid tetrahydrazide; a water-soluble dihydrazine such as an aliphatic dihydrazine having a total carbon number of 2 to 4 such as ethylene-1,2-dihydrazine, propylene-1,2-dinydrazine, propylene-1,3-hydrazine, butylene-1,3-dihydrazine, butylene-1,4-dihydrazine or butylene-2,3-dihydrazine; and a compound blocked by allowing at least a part of hydrazino groups of the multifunctional hydrazine derivative to react with a carbonyl compound such as acetaldehyde, propionaldehyde, butylaldehyde, acetone, methyl ethyl ketone, diethyl ketone, methyl-n-propyl ketone, methyl-n-butyl ketone or diacetone alcohol (hereinafter referred to as a "blocked multifunctional hydrazine derivative"), for example, adipic acid dihydrazide monoacetone hydrazone or adipic acid dihydrazide diacetone hydrazone.

The amount of this crosslinking agent added is equimolar to 0.2 mole per the total number of moles of keto groups and aldo groups. The use of such coating materials causes excellent solvent resistance.

As the above-mentioned coating material, one to which a metal chelate compound acting as a silanol condensation catalyst is added before coating, is also preferred. Here, the above-mentioned metal chelate compounds include the organic metal compounds exemplified as component (D), and so forth. The amount of this metal chelate compound is from 0.01 to 5% by weight based on aqueous dispersion (converted to solid content). The use of such coating materials can shorten the hardening time.

The structures of the coated products of the present invention include, for example, all structures in which substrates are coated with coatings containing the aqueous dispersions of the present invention, such as the following structures:

(1) A substrate/silyl group-containing polymer (E-1)/the aqueous dispersion of the invention (the aqueous dispersion alone, a blend of the aqueous dispersion and silyl group-containing polymer (E-1), a blend of the aqueous dispersion and hybrid type aqueous dispersion (E-2));

(2) A substrate/the aqueous dispersion of the invention (the aqueous dispersion alone, a blend of the aqueous dispersion and silyl group-containing polymer (E-1), a blend of the aqueous dispersion and hybrid type aqueous dispersion (E-2));

(3) A substrate/a primer/the aqueous dispersion of the invention (the aqueous dispersion alone, a blend of the aqueous dispersion and silyl group-containing polymer (E-1), a blend of the aqueous dispersion and hybrid type aqueous dispersion (E-2)); and (4) A substrate/a primer/silyl group-containing polymer (E-1)/the aqueous dispersion of the invention (the aqueous dispersion alone, a blend of the aqueous dispersion and silyl group-containing polymer (E-1), a blend of the aqueous dispersion and hybrid type aqueous dispersion (E-2)).

When the coatings containing the aqueous dispersions of the present invention are applied onto substrates, in the case of all aqueous dispersions, a brush, a roll coater, a flow coater, a centrifugal coater, an ultrasonic coater, a (micro) gravure coater and so forth are used, or dip coating, flow coating, spraying, a screening process, electric deposition, vapor deposition and so forth are utilized.

The aqueous dispersions of the present invention can form coating films having a thickness of about 0.05 to about 200 $\mu$m, as a dry thickness. Then, the coating films can be formed by drying at ordinary temperature or drying by heating at a temperature of about 30 to about 200° C. usually for about 1 to about 60 minutes.

When undercoat layers are previously formed using the aqueous dispersions of the invention or other coatings, coating films having a thickness of about 0.05 to about 20 $\mu$m with single coating application, and a thickness of about 0.1 to about 40 $\mu$m with double coating application, as a dry thickness, can be formed. Then, the coating films can be formed on various substrates by drying at ordinary temperature or drying by heating at a temperature of about 30 to about 200° C. usually for about 1 to about 60 minutes.

The total thickness of the undercoat layer and the overcoat layer is normally from 0.1 to 400 $\mu$m, and preferably from about 0.2 to about 300 $\mu$m, in dry thickness.

Substrates

The substrates to which the coatings containing the aqueous dispersions of the present invention are applicable include organic substrates such as wood and paper; substrates of metals such as iron, aluminum and stainless steel; substrates of inorganic ceramic materials such as cement, concrete, ALC, flexible boards, mortar, slate, gypsum, ceramics and brick; and so forth, as well as formed articles and films of plastics such as polyesters such as polyethylene terephthalate (PFT), polybutylene terephthalate (PBT) and polyethylene-2,6-naphthalate (PEN); polyamides such as nylon 6 and nylon 6,6; polyolefins such as polyethylene (PE) and polypropylene (PP); polycarbonates (PC); polyacrylic compounds such as polymethyl methacrylate (PMMA); ABS resins, AES resins, polybiphenyl chloride, polyvinyl alcohol, polyurethanes, polyimides, and fluororesins such as polytetrafluoroethylene (PTFE) and ethylenetetrafluoroethylene (ETFE).

For the purposes of base preparation, improvement in adhesion, sealing of porous substrates, smoothing, patterning and so forth, these substrates can also previously be surface treated. The surface treatment includes, for example, blast treatment, chemical treatment, degreasing, flaming treatment, oxidation treatment, vapor treatment, corona discharge treatment, ultraviolet irradiation treatment, plasma treatment, ion treatment and so forth.

The coating specification varies depending on the kind and state of substrate and the coating method. For example, in the case of the metallic substrate, an undercoat layer such as a primer or a sealer is provided, if rust prevention is required. In the case of the inorganic ceramic substrate, a primer or a sealer is usually used, because the opacifying properties of the coating film are different depending on characteristics (surface roughness, impregnating ability, alkalinity and so forth) of the substrate. Also in the case of the organic resin substrate, a primer or a sealer is usually used. In recoating of a deteriorated coating film, when the old coating film is significantly deteriorated, a primer or a sealer is used. In the case of the other substrates, for example, metals, tiles and glass, the undercoat layers may be provided or not depending on the use.

The undercoat layers include a filler-free primer used for the purposes of securing adhesion to the substrate or the coating composition, preventing rust, preventing efflorescence, preventing the permeation of water, and so forth, and a filler-containing sealer used for the purpose of decorating the appearance of the coating film, in addition to the above-mentioned purposes. There is no particular limitation on the kinds of primer and sealer, which can be selected according to the kind of substrate, the purpose of use and so forth. The polymers used for the undercoat layers include, for example, alkyd resins, aminoalkyd resins, epoxy resins, polyesters, acrylic resins, urethane resins, fluororesins, acrylic silicone resins, acrylic emulsions, epoxy emulsions, polyurethane emulsions, polyester emulsions, acrylic urethane emulsions, acrylic silicone emulsions, polysiloxanes, other silicon-containing emulsions and so forth. It is preferred that these polymers are used as a blend of two or more of them, and as components to be blended, the above-mentioned aqueous dispersions may be used. Preferred combinations of the primers include the acrylic emulsion/the aqueous dispersion, the acrylic emulsion/the epoxy emulsion, the silicon-containing emulsion/the epoxy emulsion, the epoxy emulsion/the acrylic urethane emulsion, the acrylic silicone emulsion/the epoxy emulsion/the acrylic emulsion and so forth. When the adhesion between the substrate and the coating films is required under severe conditions, various functional groups can be given to these polymers. Such functional groups include, for example, a hydroxyl group, a carboxyl group, a carbonyl group, an amido group, an amine group, a glycidyl group, an alkoxysilyl group, an alkylsilyl group, an ether bond, an ester bond and so forth. A hardening accelerator may be added to the resin used for the undercoat layer to use it. The compound exemplified as hardening accelerator (D) used as an optional component of the above-mentioned aqueous dispersion may also be used for the acrylic resin, the urethane resin and so forth, and for the epoxy resin, a general epoxy hardener, specifically an amine, an imidazole derivative, an acid anhydride, a polyamide resin or the like, is used.

Further, a clear layer comprising a siloxane resin coating such as a stable dispersion of colloidal silica and a siloxane resin described, for example, in U.S. Pat. Nos. 3,986,997 and 4,027,073 and so forth can also be formed on a surface of the coating film formed from the aqueous dispersion of the present invention, for the purpose of more improving the resistance to wear and improving luster of the coating film.

The mode for carrying out the present invention will be illustrated with reference to examples in more detail below, but the present invention is not limited by these examples at all.

Parts and percentages in examples and comparative examples are on a weight basis unless otherwise noted. Various measurements and evaluations in examples and comparative examples were conducted by the following methods:

(1) Adhesion

A cross-cut adhesion test (100 squares) was conducted three times according to JIS K5400, and the adhesiveness was based on the average thereof.

(2) Hardness

This measurement was based on the pencil hardness according to JIS K5400.

(3) Resistance to Alkalis

After a test piece was immersed in a saturated aqueous solution of calcium hydroxide for 60 days, the state of a coating film was visually observed. The test piece exhibiting no change was classified as "good".

(4) Resistance to Organic Chemicals

On a coating film, 2 cc of isopropyl alcohol was dropped, and wiped off after 5 minutes. Then, the state of the coating film was visually observed. The test piece exhibiting no change was classified as "good".

(5) Resistance to Moisture

After continuously maintained under circumstances of a temperature of 50° C. and a humidity of 95% for 1,000 hours, a test piece was taken out, and the state of a coating film was visually observed. The test piece exhibiting no change was classified as "good".

(6) Resistance to Weather

An irradiation test was carried out with a sunshine weather meter for 3,000 hours according to JIS K5400, and the appearance (cracking, peeling and so forth) of a coating film was visually observed. The test piece exhibiting no change was classified as "good".

(7) Resistance to Water

After a test piece was immersed in tap water at room temperature for 60 days, the state of a coating film was visually observed. The test piece exhibiting no change was classified as "good".

(8) Resistance to Stains

After coated with a paste composed of a mixture of carbon black/kerosene=1/2(in weight ratio) and left at room temperatures for 24 hours, a coating film was rinsed with water using a sponge. The stained state of the coating film was visually observed, and evaluated based on the following criteria:

○: Not stained.

Δ: Slightly stained.

X: Terribly stained.

EXAMPLES 1 TO 6 AND COMPARATIVE EXAMPLES 1 AND 2

A homogeneous solution obtained by mixing component (A), component (B) and component (C) optionally depending on the case, which are shown in Table 1, was cooled with ice, and then, sodium dodecylbenzenesulfonate as an emulsifier and water were mixed therewith to form an emulsion, which was added to a product hopper and emulsified with a high-pressure homogenizer (Microfluidizer M-110Y; manufactured by Mizuho Industrial Co., Ltd.) by applying a driving air of 4 kgf/cm$^2$ while stirring with an agitator. This emulsified product was poured into a separable flask, and a specified amount of an initiator: an aqueous solution of potassium persulfate shown in Table 1 was added with stirring. After nitrogen gas replacement, the mixture was heated at 65° C. to conduct polymerization for 4 hours. Results of the polymerization are shown together in Table 1.

TABLE 1

|  | Example | | | | | | Comparative Example | |
| --- | --- | --- | --- | --- | --- | --- | --- | --- |
|  | 1 | 2 | 3 | 4 | 5 | 6 | 1 | 2 |
| Compounding formulation (parts) Component (A); | | | | | | | | |
| X-40-9220 | 71.7 | 53.8 | 26.9 | 53.8 | 67.2 | 52.2 | 105 | |
| Dimethyl dimethoxysilane | 51.9 | 39.4 | 19.5 | 39.4 | 8.1 | 56.7 | | 114 |
| Component (B); | | | | | | | | |
| Methyl methacrylate | 8.8 | 17.6 | 30.8 | 18 | 22 | 13.2 | 13.2 | 13.2 |
| Butyl methacrylate | 8.8 | 17.6 | 30.8 | 18 | 22 | 13.2 | 13.2 | 13.2 |
| 2-Hydroxyethyl methacrylate | 1.2 | 2.4 | 4.2 | 2.4 | 2 | 1.8 | 3.0 | 1.8 |
| Acrylic acid | 0.8 | 1.6 | 2.8 | 1.6 | 3 | 1.2 | | 1.2 |
| Component (C); | | | | | | | | |
| γ-Methacryloxypropyltrimethoxysilane | 0.4 | 0.8 | 1.4 | | 1 | 0.6 | 0.6 | 0.6 |

TABLE 1-continued

|  | Example | | | | | | Comparative Example | |
|---|---|---|---|---|---|---|---|---|
|  | 1 | 2 | 3 | 4 | 5 | 6 | 1 | 2 |
| Initiator; | | | | | | | | |
| Potassium persulfate | 0.3 | 0.4 | 0.7 | | | | 0.6 | 0.6 | 0.6 |
| Ammonium persulfate | | | | 0.4 | 1 | | | |
| Emulsifier; | | | | | | | | |
| Sodium dodecylbenzenesulfonate | 0.75 | 0.75 | 1 | 0.5 | 1 | 1 | 1 | 1 |
| Emargen 920 (manufactured by KAO CORP.) | | | | 0.5 | | | | |
| Levenol WX | | | | 0.5 | | | | |
| Polymerization temperature (° C.) | 65 | 70 | 70 | 70 | 70 | 70 | 70 | 70 |
| Solid concentration (%) | 30 | 35 | 40 | 40 | 40 | 35 | 35 | 35 |
| Particle size (nm) | 320 | 170 | 150 | 140 | 180 | 150 | 400 | 120 |
| Polymerization stability | Good | Good | Good | Good | Good | Good | Poor | Good |
| Storage stability | Good | Good | Good | Good | Good | Good | Poor | Poor |

EXAMPLES 7 TO 12 AND COMPARATIVE EXAMPLES 3 AND 4

To each of the aqueous dispersions obtained in Examples 1 to 6 and Comparative Examples 1 and 2, 2% (solid content) of aqueous dibutyltin dilaurate as a hardening accelerator and 5% (solid content) of an oxiazoline aqueous emulsion, K2020 (manufactured by Nippon Shokubai Kagaku Kogyo Co., Ltd.) were added, and mixed to prepare a coating material (clear). A primer was applied to each substrate in an amount 50 g/m² by dry weight and dried as needed. Then, each coating material thus obtained was applied to each substrate in an amount of 50 g/m² by dry weight, and heated at 120° C. for 10 minutes to prepare a test piece.

For the resulting test pieces, various evaluations were made. Results of the evaluations are shown in Table 2.

EXAMPLES 13 TO 18 AND COMPARATIVE EXAMPLES 5 AND 6

Using each of the aqueous dispersions obtained in Examples 1 to 6 and Comparative Examples 1 and 2, a mixture of the compounding formulation shown in Table 3 was mixed in a sand mill. Then, 2% (solid content) of aqueous dibutyltin dilaurate as a hardening accelerator and 5% (solid content) of an oxiazoline aqueous emulsion, K2020 (manufactured by Nippon Shokubai Kagaku Kogyo Co., Ltd.) were added, and mixed to prepare a coat in a material (enamel A primer (enamel) was applied to each substrate in an amount of 50 g/m² by dry weight and dried. Then, each coating material thus obtained was applied to each substrate in an amount of 50 g/m² by dry weight, and heated at 120° C. for 10 minutes to prepare a test piece.

For the resulting test pieces, various evaluations were made. Results of the evaluations are shown in Table 3.

As the primer, there was used a mixture obtained by adding 55 parts of titanium oxide (white), 28.7 parts of

TABLE 2

|  |  | Example | | | | | | Comparative Example | |
|---|---|---|---|---|---|---|---|---|---|
| Example/Comparative Example |  | 7 | 8 | 9 | 10 | 11 | 12 | 3 | 4 |
|  |  | Example | | | | | | Comparative Example | |
| Aqueous Dispersion |  | 1 | 2 | 3 | 4 | 5 | 6 | 1 | 2 |
| Resistance to weather; |  | Good | Good | Good | Good | Good | Good | Poor | Poor |
| Adhesion; (Substrate/primer) | | | | | | | | | |
| PET film/(1) | Initial | 100 | 100 | 100 | 100 | 100 | 100 | 50 | 50 |
| Resistance to moisture | (30 days) | 100 | 100 | 100 | 100 | 100 | 100 | 50 | 50 |
| Slate plate*¹/(1) | Initial | 100 | 100 | 100 | 100 | 100 | 100 | 50 | 50 |
| Resistance to moisture | (30 days) | 100 | 100 | 100 | 100 | 100 | 100 | 50 | 50 |
| Slate plate/(2) | Initial | 100 | 100 | 100 | 100 | 100 | 100 | 50 | 50 |
| Resistance to moisture | (30 days) | 100 | 100 | 100 | 100 | 100 | 100 | 50 | 50 |
| Slate plate/(3) | Initial | 100 | 100 | 100 | 100 | 100 | 100 | 50 | 50 |
| Resistance to moisture | (30 days) | 100 | 100 | 100 | 100 | 100 | 100 | 50 | 50 |
| ABS resin plate/(1) | Initial | 100 | 100 | 100 | 100 | 100 | 100 | 50 | 50 |
| Resistance to moisture | (30 days) | 100 | 100 | 100 | 100 | 100 | 100 | 50 | 50 |
| ABS resin plate/(4) | Initial | 100 | 100 | 100 | 100 | 100 | 100 | 50 | 50 |
| Resistance to moisture | (30 days) | 100 | 100 | 100 | 100 | 100 | 100 | 50 | 50 |
| Wood*²/(5) | Initial | 100 | 100 | 100 | 100 | 100 | 100 | 50 | 50 |
| Resistance to moisture | (30 days) | 100 | 100 | 100 | 100 | 100 | 100 | 50 | 50 |

*¹: JIS A5043F,
*²: thickness: 12 mm calcium carbonate, 7 parts of clay, 7 parts of Indian red (red iron oxide) and 27.7 parts of an HEC thickening agent to 100 parts of a resin or an emulsion described in Table 3 (described in Table 3 as a "primer"), and mixing them in a sand mill.

potassium persulfate) was added after nitrogen gas replacement with stirring, followed by polymerization at 75° C. for 4 hours. After the polymerization, the pH of the system was adjusted to 7.0 with an aqueous solution of ammonia. Results of the polymerization are shown together in Table 4.

TABLE 3

| Example/Comparative Example | | 13 | 14 | 15 | 16 | 17 | 18 | 5 | 6 |
|---|---|---|---|---|---|---|---|---|---|
| | | Example | | | | | | Comparative Example | |
| Aqueous Dispersion (Example) | | 1 | 2 | 3 | 4 | 5 | 6 | 1 | 2 |
| Compounding formulation (parts) | | | | | | | | | |
| Aqueous dispersion | | 100 | 100 | 100 | 100 | 100 | 100 | 100 | 100 |
| Titanium oxide (white) | | 26 | 26 | 26 | 26 | 26 | 26 | 26 | 26 |
| HEC thickening agent | | 0.5 | 0.5 | 0.5 | 0.5 | 0.5 | 0.5 | 0.5 | 0.5 |
| Resistance to weather | | Good | Good | Good | Good | Good | Good | Poor | Poor |
| Hardness | | 2H | 2H | 2H | 2H | 2H | 2H | 3H | B |
| Resistance to alkalis | | Good | Good | Good | Good | Good | Good | Good | Poor |
| Resistance to organic chemicals | | Good | Good | Good | Good | Good | Good | Good | Poor |
| Resistance to water | | Good | Good | Good | Good | Good | Good | Good | Poor |
| Resistance to stains | | ○ | ○ | ○ | ○ | ○ | ○ | ○ | X |
| Adhesion (Substrate/primer) | | | | | | | | | |
| Inorganic ceramic substrate/(1) | Initial | 100 | 100 | 100 | 100 | 100 | 100 | 0 | 50 |
| | Sunshine 3000 hours | 100 | 100 | 100 | 100 | 100 | 100 | 0 | 50 |
| Inorganic ceramic substrate/(2) | Initial | 100 | 100 | 100 | 100 | 100 | 100 | 0 | 50 |
| | Sunshine 3000 hours | 100 | 100 | 100 | 100 | 100 | 100 | 0 | 50 |
| Inorganic ceramic substrate/(3) | Initial | 100 | 100 | 100 | 100 | 100 | 100 | 0 | 50 |
| | Sunshine 3000 hours | 100 | 100 | 100 | 100 | 100 | 100 | 0 | 50 |
| Inorganic ceramic substrate/(6) | Initial | 100 | 100 | 100 | 100 | 100 | 100 | 0 | 50 |
| | Sunshine 3000 hours | 100 | 100 | 100 | 100 | 100 | 100 | 0 | 50 |
| Foamed concrete (ALC)/(1) | Initial | 100 | 100 | 100 | 100 | 100 | 100 | 0 | 50 |
| | Sunshine 3000 hours | 100 | 100 | 100 | 100 | 100 | 100 | 0 | 50 |
| Foamed concrete (ALC)/(7) | Initial | 100 | 100 | 100 | 100 | 100 | 100 | 0 | 50 |
| | Sunshine 3000 hours | 100 | 100 | 100 | 100 | 100 | 100 | 0 | 50 |
| Foamed concrete (ALC)/(2) | Initial | 100 | 100 | 100 | 100 | 100 | 100 | 0 | 50 |
| | Sunshine 3000 hours | 100 | 100 | 100 | 100 | 100 | 100 | 0 | 50 |
| Foamed concrete (ALC)/(3) | Initial | 100 | 100 | 100 | 100 | 100 | 100 | 0 | 50 |
| | Sunshine 3000 hours | 100 | 100 | 100 | 100 | 100 | 100 | 0 | 50 |
| SUS 304/(2) | Initial | 100 | 100 | 100 | 100 | 100 | 100 | 0 | 50 |
| | Sunshine 3000 hours | 100 | 100 | 100 | 100 | 100 | 100 | 0 | 50 |

The primers in Tables 2 and 3 are as follows:

(1): Acrylic silicone emulsion (2): Acrylic emulsion/aqueous dispersion A (100/20)

(3): Acrylic emulsion/epoxy emulsion (50/50)

(4): Acrylic urethane emulsion (5): Acrylic emulsion (6): Epoxy emulsion/silicon-containing emulsion (100/20)

(7): Epoxy emulsion/polyamideamine (hardener) (100/50)

(8): Epoxy emulsion/triethylamine (hardener) (100/5)

EXAMPLES 19 TO 22

Components other than acrylic acid and a radical polymerization initiator shown in Table 4 were stirred and emulsified at room temperature for 10 minutes. Acrylic acid was added thereto, and the hydrolysis reaction was conducted at room temperature for 2 hours while continuing stirring, followed by emulsification with a high-pressure homogenizer (Microfluidizer M-110Y; manufactured by Mizuho Industrial Co., Ltd.) at a pressure of 70 Mpa. This emulsified product was poured into a separable flask, and a radical polymerization initiator (an aqueous solution of

TABLE 4

| Compounding formulation | | Example | | | |
|---|---|---|---|---|---|
| (parts) | | 19 | 20 | 21 | 22 |
| (A) | Methyltrimethoxysilane | 7 | 0 | 2 | 1 |
| | Dimethyldimethoxysilane | 6 | 13 | 0 | 1 |
| | SX101 | 18 | 0 | 0 | 0 |
| | X40-9220 | 0 | 18 | 7 | 0 |
| | X40-9225 | 0 | 0 | 0 | 2.4 |
| (B) | Methyl methacrylate | 4.7 | 4.7 | 7.7 | 9.3 |
| | n-Butyl acrylate | 3.3 | 0 | 0 | 0 |
| | Cyclohexyl methacrylate | 2.7 | 2.7 | 6 | 6.7 |
| | 2-Ethylhexyl acrylate | 0 | 3.3 | 5.7 | 6.6 |
| | 2-Hydroxyethyl methacrylate | 0.8 | 0.8 | 0.5 | 0.5 |
| | Diacetoneacrylamide (20%) | 6.7 | 1.7 | 11.9 | 0 |
| | Sodium dodecylbenzenesulfonate (10%) | 2.5 | 0 | 0 | 0 |
| | ADEKA REASOAP SE1025N (15%) | 0 | 5 | 4.4 | 4.1 |
| | Water | 46 | 51 | 58 | 64 |
| | Acrylic acid (80%) | 0.7 | 0.7 | 0.6 | 0.6 |
| | Potassium persulfate (3.5%) | 2.0 | 2.0 | 3.3 | 3.8 |
| | γ-Methacryloxytrimethoxysilane | 0.3 | 0 | 0.2 | 0.2 |
| Results of polymerization | | Good | Good | Good | Good |

SX101; A partially hydrolyzed, partially condensed product of 2 molecules of dimethyldimethoxysilane and two molecules of methyltrimethoxysilane, manufactured by Dow Corning Toray Silicone Co., Ltd.

X40-9220; A partially hydrolyzed, partially condensed product of 10 to 15 molecules of methyltrimethoxysilane, manufactured by Shin-Etsu Chemical Co., Ltd.

X40-9225; A partially hydrolyzed, partially condensed product of 15 to 30 molecules of methyltrimethoxysilane, manufactured by Shin-Etsu Chemical Co., Ltd.

EXAMPLES 23 TO 26

Using each of aqueous polymer dispersions (19) to (22) obtained in Examples 19 to 22, adipic acid dihydrazide (10% aqueous solution) and dibutyltin dilaurate (10% aqueous dispersion) were added to 100 parts of this aqueous polymer dispersion as needed as shown in Table 5, and mixed to prepare a coating agent (clear). Each coating agent obtained was applied to a degreased hard aluminum plate in an amount of 25 g/m² by dry weight, and heated at 80° C. for 6 minutes to prepare a test piece. For the resulting test pieces, various evaluations were made. Results of the evaluations are shown in Table 5.

TABLE 5

| | Example | | | |
|---|---|---|---|---|
| Compounding formulation (parts) | 23 | 24 | 25 | 26 |
| Aqueous dispersion | 19 | 20 | 21 | 22 |
| Adipic acid dihydrazide (10% aqueous solution) | 6.9 | 1.8 | 11.9 | 0 |
| Dibutyltin dilaurate (10% aqueous dispersion) | 2 | 2 | 0 | 0 |
| Adhesion | Good | Good | Good | Good |
| Hardness | 2H | 2H | 2H | H |
| Resistance to alkalis | Good | Good | Good | Good |
| Resistance to organic chemicals | Good | Good | Good | Good |
| Resistance to moisture | Good | Good | Good | Good |
| Resistance to weather | Good | Good | Good | Good |
| Resistance to water | Good | Good | Good | Good |
| Resistance to stains | ○ | ○ | ○ | ○ |

COMPARTIVE EXAMPLES 7 TO 10

For respective components shown in Table 6, aqueous dispersions were polymerized and prepared in the same manner as with Examples 19 to 22. Results of the polymerization are shown together in Table 6.

TABLE 6

| Compounding formulation | Comparative Example | | | |
|---|---|---|---|---|
| (parts) | 7 | 8 | 9 | 10 |
| (A) Methyltrimethoxysilane | 0.058 | 11.6 | 7 | 7 |
| Dimethyldimethoxysilane | 0.05 | 9.9 | 6 | 6 |
| SX101 | 0.15 | 29.8 | 18 | 18 |
| (B) Methyl methacrylate | 11.7 | 0.058 | 4.7 | 4.7 |
| n-Butyl acrylate | 8.2 | 0.041 | 3.3 | 3.3 |
| Cyclohexyl methacrylate | 6.7 | 0.034 | 2.7 | 2.7 |
| 2-Hydroxyethyl methacrylate | 2 | 0.01 | 0.8 | 0.8 |
| Diacetoneacrylamide (20%) | 16.7 | 0.08 | 6.7 | 6.7 |
| Sodium dodecylbenzenesulfonate (10%) | 2.5 | 2.5 | 25 | 2.5 |
| Water | 36 | 53 | 23 | 46 |
| Acrylic acid (80%) | 0.7 | 0.7 | 0.7 | 0 |
| Potassium persulfate (3.5%) | 2.0 | 2.0 | 2.0 | 2.0 |
| γ-Methacryloxytrimethoxysilane | 0.3 | 0.3 | 0.3 | 0.3 |
| Results of polymerization | Good | Good | Good | Coagulated |

COMPARATIVE EXAMPLES 11 TO 13

Using each of aqueous polymer dispersions (7) to (9) obtained in Comparative Examples 7 to 9, adipic acid dihydrazide (10% aqueous solution) and dibutyltin dilaurate (10% aqueous dispersion) were added to 100 parts of this aqueous polymer dispersion as needed as shown in Table 7, and mixed to prepare a coating agent (clear). Each coating agent obtained was applied to a degreased hard aluminum plate in an amount of 25 g/m² by dry weight, and heated at 80° C. for 6 minutes to prepare a test piece. For the resulting test pieces, various evaluations were made. Results of the evaluations are shown in Table 7. In Comparative Example 10, the whole system was coagulated in the course of polymerization, so that the performances of the coating material could not be evaluated.

TABLE 7

| | Comparative Example | | |
|---|---|---|---|
| Compounding formulation (parts) | 11 | 12 | 13 |
| Aqueous dispersion | (7) | (8) | (9) |
| Adipic acid dihydrazide (10% aqueous solution) | 17 | 0.09 | 6.9 |
| Dibutyltin dilaurate (10% aqueous dispersion) | 0.02 | 3.3 | 2 |
| Adhesion | Good | Good | Poor |
| Hardness | B | 2H | 2H |
| Resistance to alkalis | Good | Poor | Good |
| Resistance to organic chemicals | Poor | Good | Good |
| Resistance to moisture | Poor | Good | Poor |
| Resistance to weather | Poor | Good | Poor |
| Resistance to water | Good | Good | Poor |
| Resistance to stains | X | ○ | ○ |

Industrial Applicability

The aqueous dispersions of the present invention are extremely excellent in storage stability, moreover excellent in the balance of performances such as adhesion, resistance to alkalis, resistance to organic chemicals, resistance to moisture, resistance to weather, resistance to (hot) water and stain recovery, can form coating films which are transparent and high in hardness, and particularly, are useful as coating materials.

What is claimed is:

1. An aqueous dispersion obtained by (i) hydrolysis, condensation or both hydrolysis and condensation, and (ii) radical polymerization of a vinyl monomer-containing mixture comprising
   (A) at least one member selected from the group consisting of an organosilane, a hydrolyzate of the organosilane, and a condensate of the organosilane, and
   (B) a radical polymerizable vinyl monomer,
   wherein the vinyl monomer-containing mixture is in the form of an emulsion with water and the vinyl monomer-containing mixture has an average particle size of 0.5 μm or less.

2. The aqueous dispersion according to claim 1, wherein (A) is an organosilane represented by the formula $(R^1)$—$(Si)$—$(OR^2)_3$, wherein $R^1$ is a monovalent organic group having 1 to 8 carbon atoms, and $R^2$'s, which are the same or different, each is an alkyl group having 1 to 5 carbon atoms or acyl groups having 1 to 6 carbon atoms, a hydrolyzate of said organosilane or a condensate of said organosilane in an amount of 50 mol % or more based on the total component (A).

3. The aqueous dispersion according to claim 1, wherein component (B) is an unsaturated carboxylic acid-containing radical polymerizable monomer.

4. The aqueous dispersion according to claim 1, which further comprises (C) a silane coupling agent.

5. A method for producing the aqueous dispersion according to claim 1, which comprises emulsifying by means of a high pressure homogenizer, an ultrasonic wave or a homomixer, a mixture comprising (A) at least one organosilane, a hydrolyzate of said organosilane and a condensate of said organosilane, and (B) a radical polymerizable vinyl monomer, in the presence of water and an emulsifier, and then, adding a radical polymerization initiator to conduct hydrolysis, condensation or both hydrolysis and condensation, and radical polymerization.

6. The method according to claim 5, wherein the emulsifier is a reactive emulsifier.

7. The method according to claim 5, wherein the radical polymerization initiator is a water-soluble initiator.

8. The method according to claim 5, wherein the mixture further comprises (D) a hydrolysis, condensation or both hydrolysis and condensation catalyst for component (A).

9. The method according to claim 8 wherein said catalyst (D) contains an unsaturated carboxylic acid.

10. A coating material containing the aqueous dispersion according to claim 1.

11. The coating material according to claim 10, wherein the aqueous dispersion comprises an aldo group- and/or keto group-containing radical polymerizable monomer (B) in an amount of 0.5 to 20% by weight.

12. The coating material according to claim 10, further comprising a metal chelate compound acting as a silanol condensation catalyst.

13. A coated product comprising a substrate and the coating material according to claim 10 painted thereon.

14. The coated product according to claim 13, wherein the substrate is provided with an undercoat layer.

15. The coating material according to claim 11, further comprising a crosslinking agent having two or more hydrazide groups.

16. The aqueous dispersion according to claim 1, wherein the average particle size of the vinyl monomer-containing emulsion is from 0.05 to 0.2 $\mu$m.

17. The aqueous dispersion according to claim 1, wherein the condensed, hydrolyzed, or condensed and hydrolyzed component (A) and the radically polymerized component (B) are present as an interpenetrating network structure.

18. The aqueous dispersion according to claim 17, wherein the dispersion comprises emulsion particles wherein the condensed, hydrolyzed, or condensed and hydrolyzed component (A) and the radically polymerized component (B) are present as entangled molecules in a solventless state.

19. The aqueous dispersion according to claim 1, wherein the organosilane is at least one selected from the group consisting of methyltrimethoxysilane, methyltriethoxysilane, dimethyldimethoxysilane and dimethyldiethoxysilane, and wherein the vinyl monomer is at least one selected from the group consisting of methyl methacrylate, butyl methacrylate, acrylic acid and 2-hydroxyethyl methacrylate.

* * * * *

UNITED STATES PATENT AND TRADEMARK OFFICE
CERTIFICATE OF CORRECTION

PATENT NO. : 6,953,821 B2
DATED : October 11, 2005
INVENTOR(S) : Tamori et al.

Page 1 of 1

It is certified that error appears in the above-identified patent and that said Letters Patent is hereby corrected as shown below:

<u>Title page,</u>
Item [45] and [*] Notice, should read as follows:
-- [45] **Date of Patent: *Oct. 11, 2005**

[*] Notice: Subject to any disclaimer, the term of this patent is extended or adjusted under 35 U.S.C. 154(b) by 0 days.

This patent is subject to a terminal disclaimer. --.

Signed and Sealed this

Twenty-ninth Day of November, 2005

JON W. DUDAS
*Director of the United States Patent and Trademark Office*